US009069801B2

(12) United States Patent  (10) Patent No.: US 9,069,801 B2
Gala et al.  (45) Date of Patent: *Jun. 30, 2015

(54) LOCATION-BASED AND OTHER CRITERIA-BASED ESTABLISHMENT MANAGEMENT SYSTEMS AND METHODS

(71) Applicant: Mitesh Gala, Cosa Mesa, CA (US)

(72) Inventors: Mitesh Gala, Santa Ana, CA (US); Gurminder Pal Dhamija, Huntington Beach, CA (US)

(73) Assignee: Mitesh Gala, Santa Ana, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/049,514

(22) Filed: Oct. 9, 2013

(65) Prior Publication Data

US 2014/0108457 A1   Apr. 17, 2014

Related U.S. Application Data

(63) Continuation of application No. 13/597,866, filed on Aug. 29, 2012, now Pat. No. 8,584,019.

(51) Int. Cl.
*G06F 3/0481* (2013.01)
*G06F 17/30* (2006.01)
*G06Q 50/00* (2012.01)
*G06Q 10/10* (2012.01)

(52) U.S. Cl.
CPC .......... *G06F 17/30289* (2013.01); *G06Q 50/00* (2013.01); *G06Q 10/10* (2013.01)

(58) Field of Classification Search
CPC ................................................ G06F 17/30873

USPC .......................................................... 715/738
See application file for complete search history.

(56) References Cited

U.S. PATENT DOCUMENTS

| 6,976,068 | B2 * | 12/2005 | Kadam et al. ................. 709/223 |
|---|---|---|---|
| 7,069,581 | B2 * | 6/2006 | Fu et al. ............................ 726/3 |
| 7,376,907 | B2 * | 5/2008 | Santoro et al. ................ 715/765 |
| 8,107,100 | B2 * | 1/2012 | Abraham et al. ............ 358/1.14 |
| 8,584,019 | B1 | 11/2013 | Gala |
| 2008/0141174 | A1 * | 6/2008 | Kodosky et al. .............. 715/835 |
| 2008/0256643 | A1 * | 10/2008 | Jones et al. ..................... 726/27 |
| 2008/0288453 | A1 * | 11/2008 | Smetters et al. ................. 707/3 |
| 2009/0276771 | A1 * | 11/2009 | Nickolov et al. .............. 717/177 |
| 2009/0307105 | A1 * | 12/2009 | Lemay et al. ................... 705/26 |
| 2010/0122196 | A1 * | 5/2010 | Wetzer et al. ................. 715/769 |
| 2010/0157989 | A1 * | 6/2010 | Krzyzanowski et al. ..... 370/352 |
| 2010/0306775 | A1 * | 12/2010 | Appiah et al. ................ 718/100 |
| 2010/0312606 | A1 * | 12/2010 | Gala .................................. 705/9 |
| 2010/0332509 | A1 * | 12/2010 | Rogers et al. ................. 707/759 |
| 2011/0010759 | A1 * | 1/2011 | Adler ................................ 726/4 |
| 2011/0078773 | A1 * | 3/2011 | Bhasin et al. .................... 726/5 |
| 2011/0252460 | A1 * | 10/2011 | Wetzer et al. .................... 726/4 |
| 2011/0277027 | A1 * | 11/2011 | Hayton et al. .................... 726/8 |
| 2012/0066287 | A1 * | 3/2012 | Hajost ........................... 709/203 |
| 2012/0072312 | A1 * | 3/2012 | Lange et al. ................. 705/27.1 |
| 2012/0096521 | A1 * | 4/2012 | Peddada ........................... 726/4 |
| 2012/0109999 | A1 * | 5/2012 | Futty et al. ................... 707/769 |
| 2012/0197765 | A1 * | 8/2012 | Kim et al. .................... 705/27.1 |

(Continued)

*Primary Examiner* — Reza Nabi
(74) *Attorney, Agent, or Firm* — Knobbe Martens Olson & Bear LLP

(57) ABSTRACT

The disclosure herein provides methods, systems, and devices for managing, controlling, accessing, modifying, converting, and/or tracking software applications across one or more locations, and/or computing devices, and/or users, and/or other criteria.

18 Claims, 22 Drawing Sheets

(56) References Cited

U.S. PATENT DOCUMENTS

| | | | |
|---|---|---|---|
| 2012/0216122 A1* | 8/2012 | Wong et al. | 715/738 |
| 2012/0227094 A1* | 9/2012 | Begen et al. | 726/4 |
| 2012/0246291 A1* | 9/2012 | Wong et al. | 709/224 |
| 2012/0303763 A1* | 11/2012 | Duggal | 709/219 |
| 2012/0311659 A1* | 12/2012 | Narain et al. | 726/1 |
| 2013/0007591 A1* | 1/2013 | Kothari et al. | 715/234 |

* cited by examiner

Figure 14

Add a New Employees

- First Name:
- Last Name:
- Employee ID:
- Emp. Card #:
- Employee Card Required:
- Employee Card Required For Clock-In/Out:
- Access Level:
- PIN Number:
- Drivers License #:
- Drivers License Exp Date:
- External Ref #:
- Allow Sign-In W/O Clocking In:
- Deny Sign-In:
- Deny All Access:
- Is a Trainee:
- Job Code:

102

LOCATION-BASED AND OTHER CRITERIA-BASED ESTABLISHMENT MANAGEMENT SYSTEMS AND METHODS

CROSS-REFERENCE TO RELATED APPLICATIONS

This application is a continuation of U.S. patent application Ser. No. 13/597,866, titled LOCATION-BASED AND OTHER CRITERIA-BASED ESTABLISHMENT MANAGEMENT SYSTEMS AND METHODS, filed on Aug. 29, 2012, which is hereby incorporated by reference herein in its entirety.

BACKGROUND

1. Field

The disclosure relates generally to the field of software management, and more particularly, to the field of managing software across multiple locations, multiple users, and any other criteria.

2. Description

With the development of new technologies, for example, tablet computers, mobile smartphones, and other computing devices, there is an increasing need for different types of software applications for use on such computing devices. For example, users of such computing devices can obtain software applications for accessing or processing data, playing games, for dictating memorandums, and the like. To enable easy access and purchase to such software applications, some companies have developed software application stores, also known as app stores. By using such app stores, users can download and/or purchase various kinds of software applications for the users' one or more computing devices.

In situations where a user has more than one computing device, or more than one location at which to install software, it can be difficult and challenging for a user to manage all the various software applications that the user has downloaded or acquired for the multiple computing devices or locations of the user. The situation can be made more complicated when there are multiple users of the one or more computing devices or are multiple users at a location. For example, there can be situations where it is desirable that only certain users have access to particular software applications on one or more selected computing devices or at one or more locations. Accordingly, it can be advantageous to have a system and/or methods for managing and controlling software applications based on a multitude of criteria.

SUMMARY

Advancements in technology make it possible to remotely manage and/or control software applications, versions thereof, and the like on one or more devices located at one or more locations from a central location.

In some embodiments, a locations-based application management system comprises: a locations database configured to store data of one or more establishment locations of a user, wherein each of the one or more establishment locations comprises a different location; an establishment location information system configured to receive establishment data from a user interface, the establishment location information system comprising: a user interface module configured to electronically connect over a network connection to a computing device configured to display the user interface to the user, the user interface module configured to cause display of a listing of the one or more establishment locations through the user interface and to receive establishment data inputted by the user though the user interface; and a location management module configured to electronically access and store the establishment data in the locations database; an applications database configured to store software applications for download; and an applications store system configured to distribute software applications to the user through an applications store interface, the applications store system comprising: an applications store interface module configured to electronically connect over a network connection to computing devices configured to display the applications store interface, wherein the applications store interface is configured to electronically receive a software application selection and an establishment location selection where the software application selection is to be installed, the establishment location selection is selected from the one or more establishment locations of the user; and an applications management module configured to allow the user to access the software application selection and to electronically record in the locations database that the establishment location selection is permitted to access the software application selection.

In certain embodiments, a computer-implemented method for controlling access to a software application based on an establishment location, the computer-implemented method comprising: receiving, by a computer system, an establishment location selection, the establishment location selection selected from one or more establishment locations of a user, the one or more establishment locations stored in a locations database; receiving, by the computer system, a software application selection, the software application selection selected from one or more software applications stored in an applications database and available for download by the user; and storing, by the computer system, in the locations database that the establishment location selection comprises permission rights to access the software application selection, wherein the computer system comprises a computer processor and an electronic storage medium.

In some embodiments, a computer-readable, non-transitory storage medium has a computer program stored thereon for causing a suitably programmed computer system to process by one or more computer processors computer-program code by performing a method for controlling access to a software application based on an establishment location when the computer program is executed on the suitably programmed computer system, the method comprising: receiving, by a computer system, an establishment location selection, the establishment location selection selected from one or more establishment locations of a user, the one or more establishment locations stored in a locations database; receiving, by the computer system, a software application selection, the software application selection selected from one or more software applications stored in an applications database and available for download by the user; and storing, by the computer system, in the locations database that the establishment location selection comprises permission rights to access the software application selection, wherein the computer system comprises a computer processor and an electronic storage medium.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIG. 14 is an embodiment of a schematic diagram illustrating a user interface of an application configured to add users for controlling and/or accessing an application.

DETAILED DESCRIPTION

Figure 1:
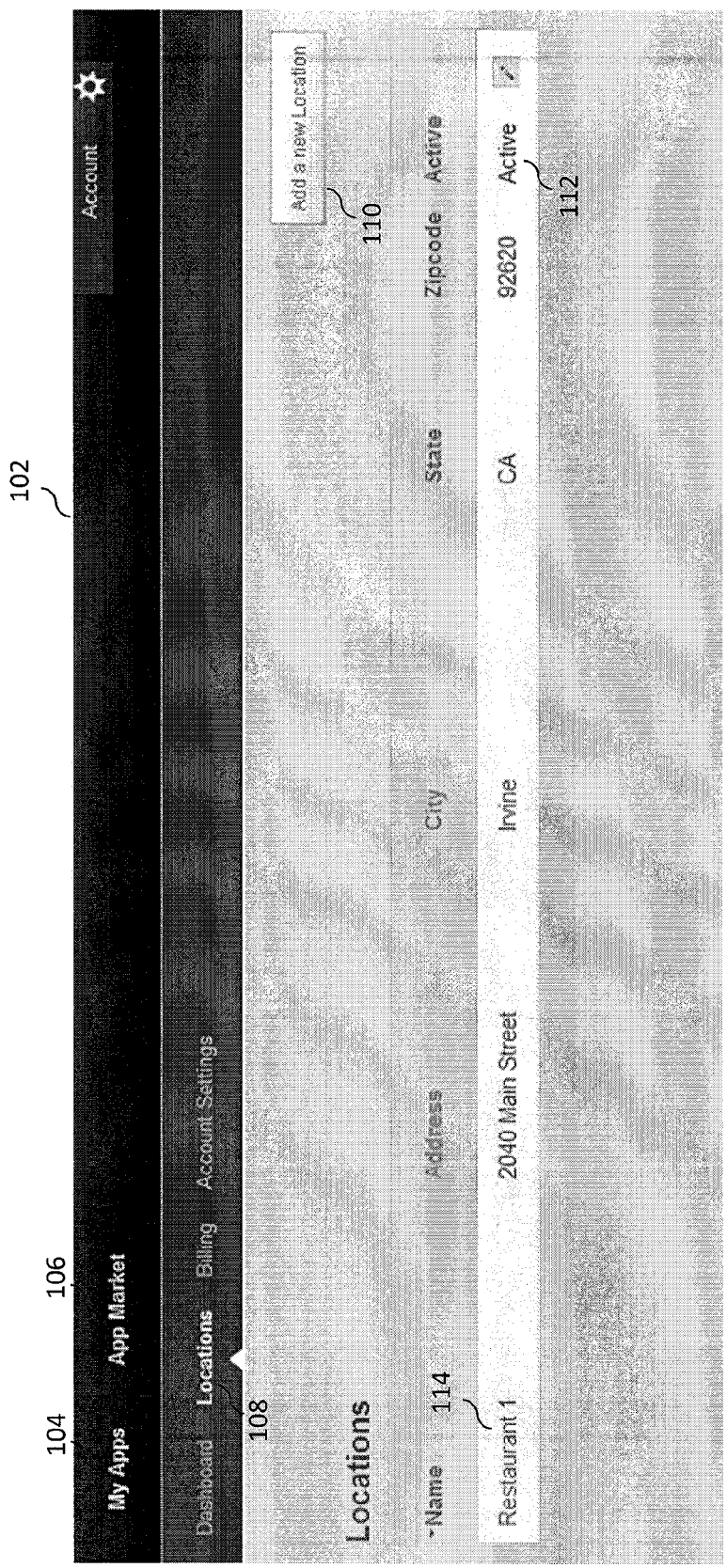
FIG. 1 is an embodiment of a schematic diagram illustrating a user interface for purchasing applications from an application store that can manage multiple locations and/or users.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The disclosure herein provides methods, systems, and devices for managing, controlling, accessing, modifying, converting, and/or tracking software applications across one or more locations, and/or computing devices, and/or users, and/or other criteria.

With the development of new technologies, such as tablet computers, smartphone devices, mobile computing devices, computer devices, and the like, there has been an increased need for new types of software applications. To facilitate the access and purchase of such new software applications, some companies have developed application stores, also known as app stores.

Typical app stores today generally are consumer oriented. In other words, a user typically logs into an app store with a user name to purchase software for a particular computing device. The software is then downloaded into the particular computing device and the user is able to use that piece of software on the selected computed device. In other words, the app store views the owner of the account as the layer that holds the application software. Generally, the purchased or downloaded application can only be used on the mobile device and/or a limited number of other computing devices and/or mobile devices that are linked to the same user account, physically available to the user, and mainly operated by the same user.

If the user would like to use the same software application on a different computing device that is remotely located, not linked with the same user account, and/or mainly operated by others, the user typically has to create a new account at the app store wherein the new account for the user is associated with the new device. For users with multiple computing devices that can be remotely located and/or configured to be mainly operated by another, the process of creating new accounts for each particular mobile device can become complex and challenging to manage.

This situation is further complicated in situations where the owner of the computing device wishes to allow multiple users to access the software application on a particular computing device. In these circumstances, an owner of a computing device must configure each computing device and each selected software application to allow certain users specific access to the software application on the particular computing device. The specific configuration of particular computing devices to allow access to users can be further complicated when the owner of the computing device is a business that experiences significant employee churn. As employees come and go, the owner of the computing device must reconfigure the access to the software application on the computing device. Additionally, the situation can become more complicated for the owner of a computing device when the owner wishes to grant certain users with more or less access to the selected software application. In such scenarios, the owner of the device must access the particular computing device in order to configure the selected software application for changing user privileges for the selected application for particular users of the application.

The systems and methods and devices disclosed herein provide solutions to the foregoing problems as well as other challenges in managing software applications. For example, the system can be configured to allow a user to set up an account at an application store such that the user can link a particular account at the app store to multiple locations or facilities at which the user installs software applications. The locations and/or facilities can be remotely located from the user and can further comprise one or more computing devices. This feature can be particularly useful for owners of restaurants or other establishments where the owner has multiple computing devices, such as a point of sale system, installed at each location or establishment. For each point of sale system, the owner may wish to install one or more applications on the system. Using the system disclosed herein, an owner can obtain and/or purchase various software applications from an application store for installing on selected computing systems at particular locations or establishments.

In an example, a restaurant owner owns three franchise stores, restaurant A, restaurant B, and restaurant C. At each restaurant, the owner has installed one or more point of sale terminals configured to operate various software applications. By using the system disclosed herein, the owner can establish an account at an application store and configure the account to be associated with the three restaurants and/or the one or more computing devices at each restaurant. Additionally, the user can optionally configure the account to be associated with one or more users and/or one or more privilege levels.

To obtain or purchase software applications, the user can log into the application store, and browse and/or select various software applications for installation. After selecting the software application for installation, the user can then select a particular location for installing the software at. Additionally, the user can optionally select a particular computing device at a particular location to install the software in. Further, the user can optionally select a particular user that can access the selected software application installed at a particular location and/or computing device at a particular location. Further, the owner of the account can optionally select a privileged level at the application store for a particular user that has been granted access to a particular software application installed at a particular location and/or on a particular computing device. Any and/or all of the foregoing features can be selected by the user from a remote location, thereby allowing convenient access and management of one or more software applications at one or more remote locations.

In other words, by utilizing the system disclosed herein, the owner, from a single location, can install different applications at different locations and/or on different computing devices. For example, an owner, using a single account at an app store, can install a marketing campaign management software application at a particular location and/or on a particular computing device while installing a point of sale software application at a different location or different computing device. Additionally, the user/owner can install software applications having a different version type at a particular location. For example, the owner can install a professional version of a point of sale software application at one location and install an entry level version of a point of sale software application at a different location.

The advantage of being able to install different kinds or types or versions of applications at different locations or on different computing devices is that the owner can control cost in some instances by choosing less expensive software applications for a first location while choosing more expensive software applications for a second location. Accordingly, the owner of the account at the application store can very easily manage various software applications installed at multiple locations and/or on multiple computing devices. This central management of software applications at the application store can reduce the administrative burden of managing software applications for owners of multiple restaurants or other establishments. This same example can be applied to other scenarios as well, for example, owners of multiple computing devices.

In an embodiment, an owner owns multiple computing devices, for example, a laptop for each member of the owner's family, a smart phone mobile device for each family member of the owner, and a home entertainment set-top box. For each of the foregoing computing devices, an owner can establish a single account at an application store wherein the account is linked and/or associated with each of the foregoing computing devices regardless of the main user of each computing device. By linking and/or associating each of the foregoing computing devices with the account, the owner can allow software applications to be selected and/or purchased from the application store for installation on a particular computing device. In some embodiments, the owner can select and/or purchase software applications to be installed on a particular computing device from a remote location. Additionally, the linking of the computing devices to a single account on an application store can allow the owner to centrally manage the applications that are installed on the computing devices, regardless of location, in a similar fashion as disclosed in the example above.

The terms "app store" and "application store" as used herein are broad interchangeable terms, and unless otherwise indicated, the terms can include within their meaning, without limitation, a website, application, or other system for distributing software to users. The software applications made available through the application store can be purchased or can be freely available. The software applications available on the application store can be downloaded, or be accessed over a network, also known as software as a service.

The terms "software application" or "application" as used herein are broad interchangeable terms, and unless otherwise indicated, the terms can include within their meaning, without limitation, computer programs for performing functions or calculations for a user. Software applications can be downloaded or can be accessed through an electronic network connection in order to provide the software as a service, or the software can be obtained using a combination of the foregoing.

The term "access data" as used herein is a broad term, and unless otherwise indicated, the term can include within its meaning, without limitation, any information that can be used to determine whether a user can access a software application. Access data can include, for example, location data of the user or a facility, user name, user identity, security level clearance level, access card, security code/password, job title, seniority, management level, time of day, date, or the like.

The terms "location," "establishment location," "facility," "store," and "restaurant" as used herein are broad interchangeable terms, and unless otherwise indicated, the terms can include within their meaning, without limitation, a location, a facility, an establishment, a facility, a store, a restaurant, a chain, a branch, or the like. In the embodiments disclosed herein, the operations of the systems and methods that can be applied to a location can also be applied to a plurality of computing devices.

FIG. 1 is an embodiment of a schematic diagram illustrating a user interface 102 for purchasing applications from an application store. In an embodiment the application store can enable a user to manage software applications installed or otherwise accessible from multiple locations. As illustrated in the user face 102, a user can aggregate a plurality of software applications previously purchased or otherwise obtained from the app store by clicking on the "my apps" button 104. Additionally, a user can utilize the application store to purchase and/or obtain other software applications by selecting the "app market" button 106. In an embodiment, the system is configured to enable the user to store and/or link multiple locations or facilities to a particular account at an app store. For example, a user can select the "locations" button 108 to display the one or more locations or facilities associated with an account at the app store. As illustrated in FIG. 1, the user interface 102 can be configured to display a listing of the one or more locations 114, 116 that are linked to and/or that are associated with a particular account at the application store. In some embodiments, a single location and/or facility can comprise one or more computing devices. For example, a single location and/or facility that is displayed on the user interface 102 can represent one or more computing devices located or otherwise associated with the single location and/or facility.

In an embodiment, the user interface 102 and any secondary screens or popup screens can be implemented as a web interface for display on a remote computing system. The user interface 102 can be configured to transmit data to and from a main server system through an electronic network connection, such as the internet. In other embodiments, the user interface 102 and any secondary windows can be implemented as a software application specifically configured for allowing users access to an application store. In either instance, the user interface can be connected to an electronic database for storing and accessing data in the database. The user interface 102 can be configured to operate on a computing device as described herein.

In an embodiment, the system can be configured to enable the user to activate or deactivate particular locations or facilities thereby enabling or preventing software applications to be purchased or accessed at a particular location. For example, the illustrative user interface 102 depicts that restaurant 1 is an active location as indicated by the status window 112, which can mean that a user can install and/or purchase software applications for this particular location and/or one or more computing devices located at or otherwise associated with this particular location. In contrast, in FIG. 2, the illustrative user interface 102 depicts that the restaurant location 1 is inactive as shown in the status window 114.

Figure 2:
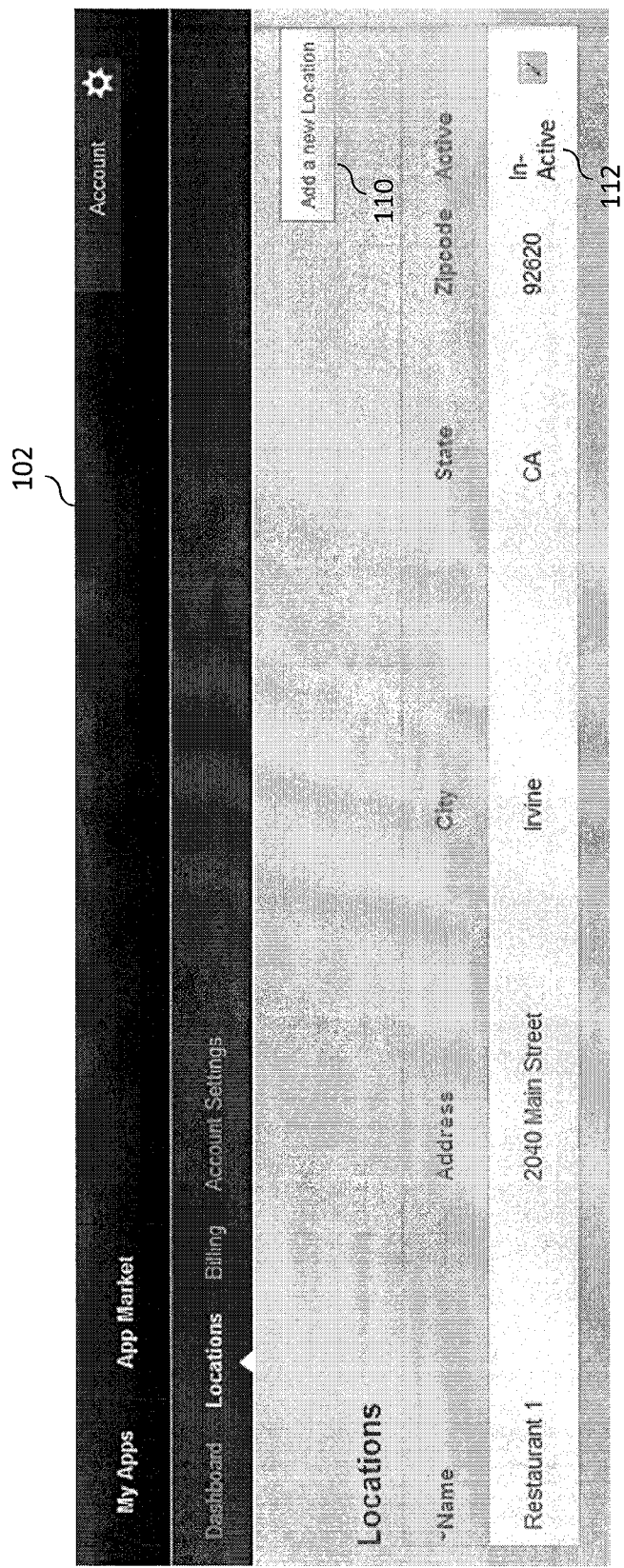
FIG. 2 is an embodiment of a schematic diagram illustrating a user interface for controlling the active state of a particular location and/or user.
Figure 3:
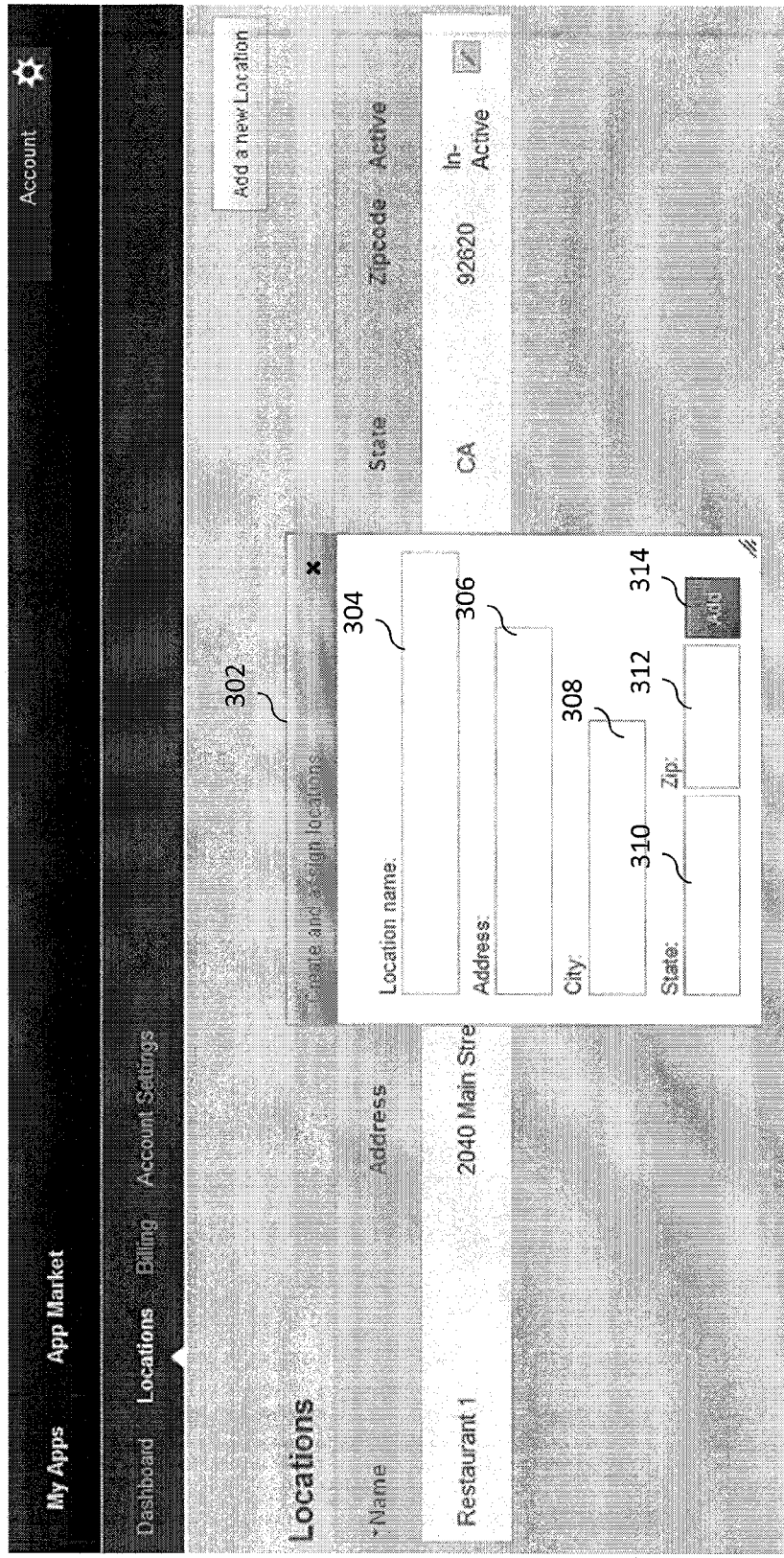
FIG. 3 is an embodiment of a schematic diagram illustrating a user interface for adding to an application store additional locations and/or users.
Figure 4:
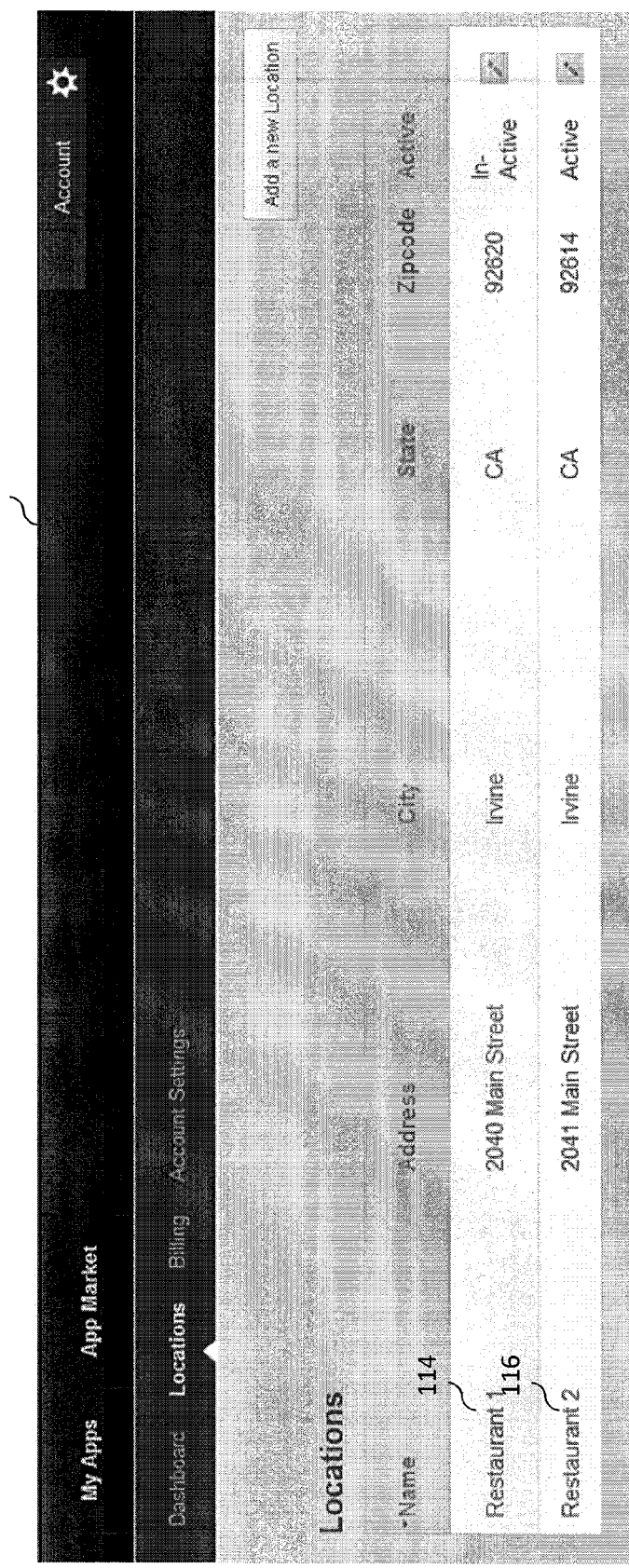
FIG. 4 is an embodiment of a schematic diagram illustrating a user interface showing multiple locations managed by an application store.

As illustrated in FIGS. 1 and 2, the system can be configured to enable a user to add multiple locations to a particular account at an application store. For example, a user can select the "add a new location" button 110 in order to add a new location and/or facility to a particular app store account. By selecting the "add a new location" button 110, the system can be configured to display a secondary screen and/or popup screen 302 to enable the user to add necessary information for adding the new location and/or facility to the application store account. For example, the secondary window 302 can comprise a plurality of text fields 304, 306, 308, 310, 312 in order to add various information about the location and/or facility to be added to the account. For example, a user can add in a location name in text field 304, an address of the location in text field 306, the city of the location in text box 308, the state of the location in text box 310 and a zip code for the location in text box 312. To add the information to the account, the user can select the "add" button 314. This location data can be transmitted over an electronic network connection to an electronic database for storing such information. As illustrated in FIG. 4, the user interface 102 can be configured to update a listing of locations based on the additional data provided by the user regarding additional locations and/or facilities. For example, the user interface 102 in FIG. 4 depicts that two locations 114, 116 are linked or associated with this particular account at the application store. In contrast, in FIG. 1 the user interface depicts only one location 114 as being linked or associated with this particular account at the application store.

Figure 5:
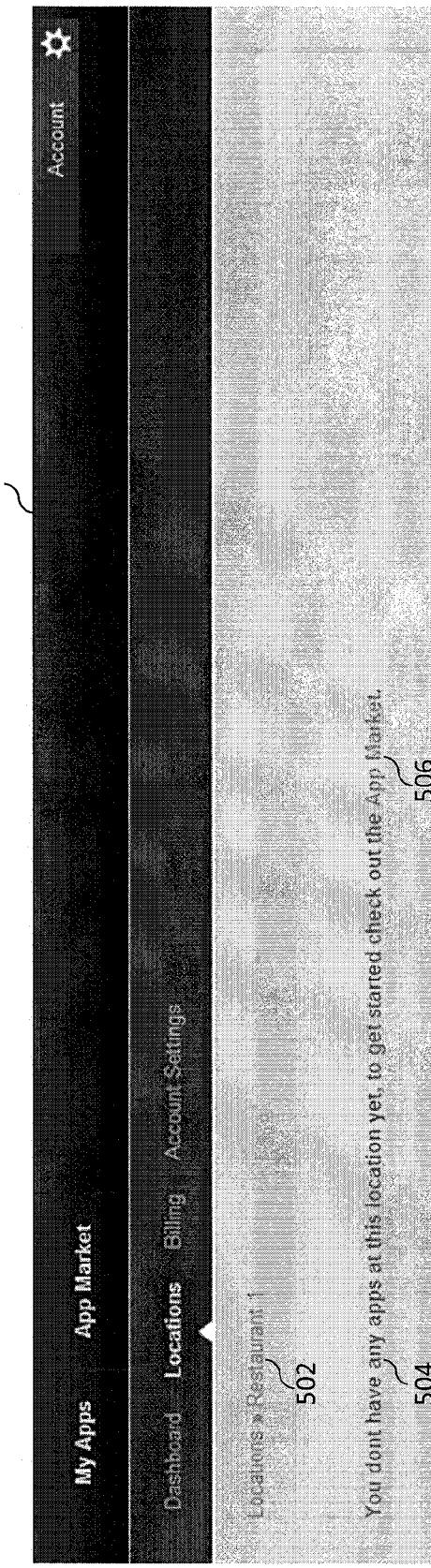
FIG. 5 is an embodiment of a schematic diagram illustrating a user interface for an application store that can assign particular applications to a location.

As illustrated in FIG. 5, the system can be configured to allow a user to select a location to determine the software applications that are installed or are accessible by the selected location or facility. For example, FIG. 5 illustrates that a user has selected restaurant location 1 as depicted by status indicator 502. In this example, the system returns a message 504 to the user, informing the user that there are no software applications installed or made accessible to the location. In order to add software applications to the location, the user can access the app store to select and/or purchase applications for the particular location. In an embodiment, the user can simply click on the app market button 506 to access the application store.

Figure 6:
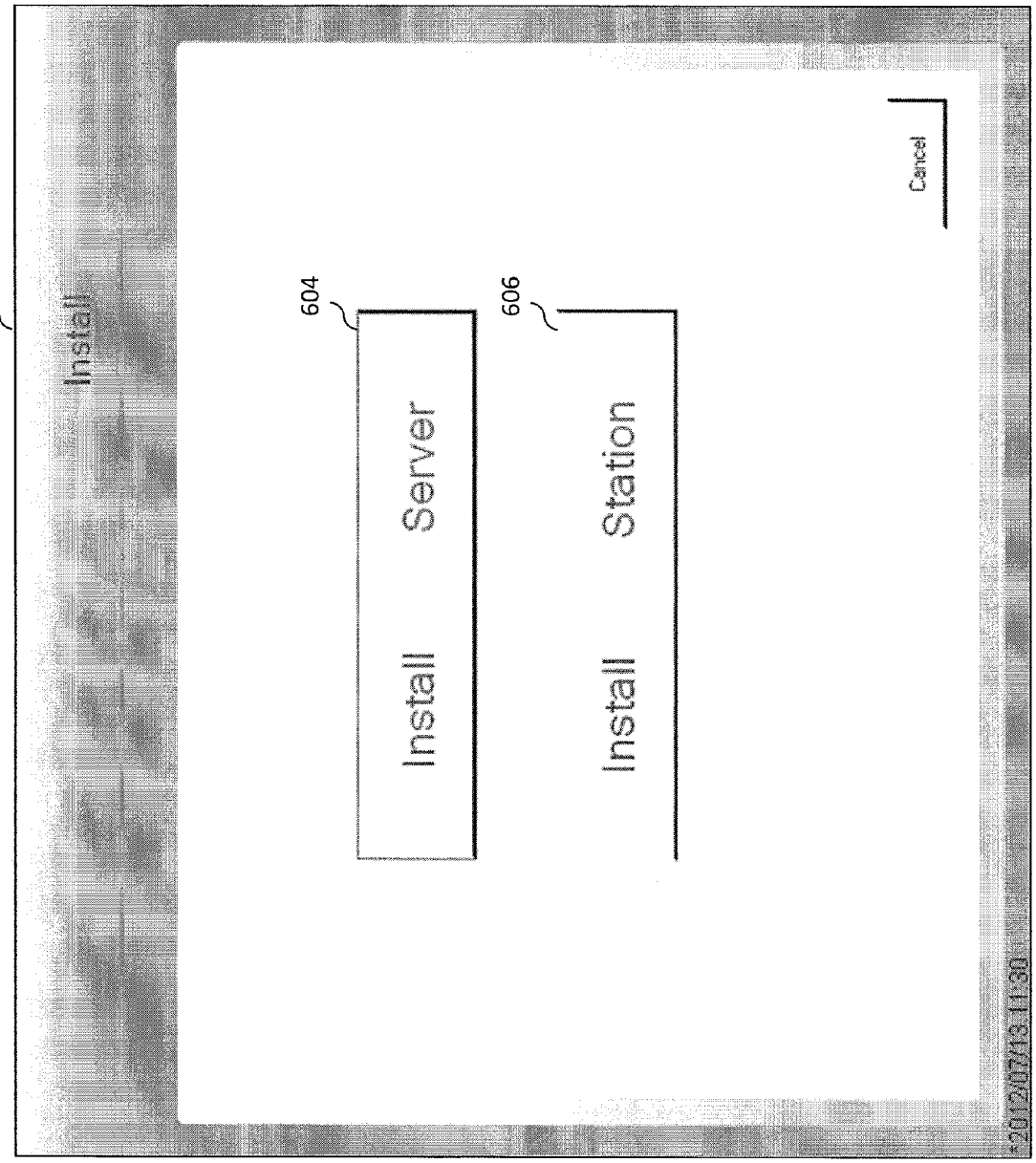
FIG. 6 is an embodiment of a schematic diagram illustrating a user interface for installing an application purchased from an application store.
Figure 7:
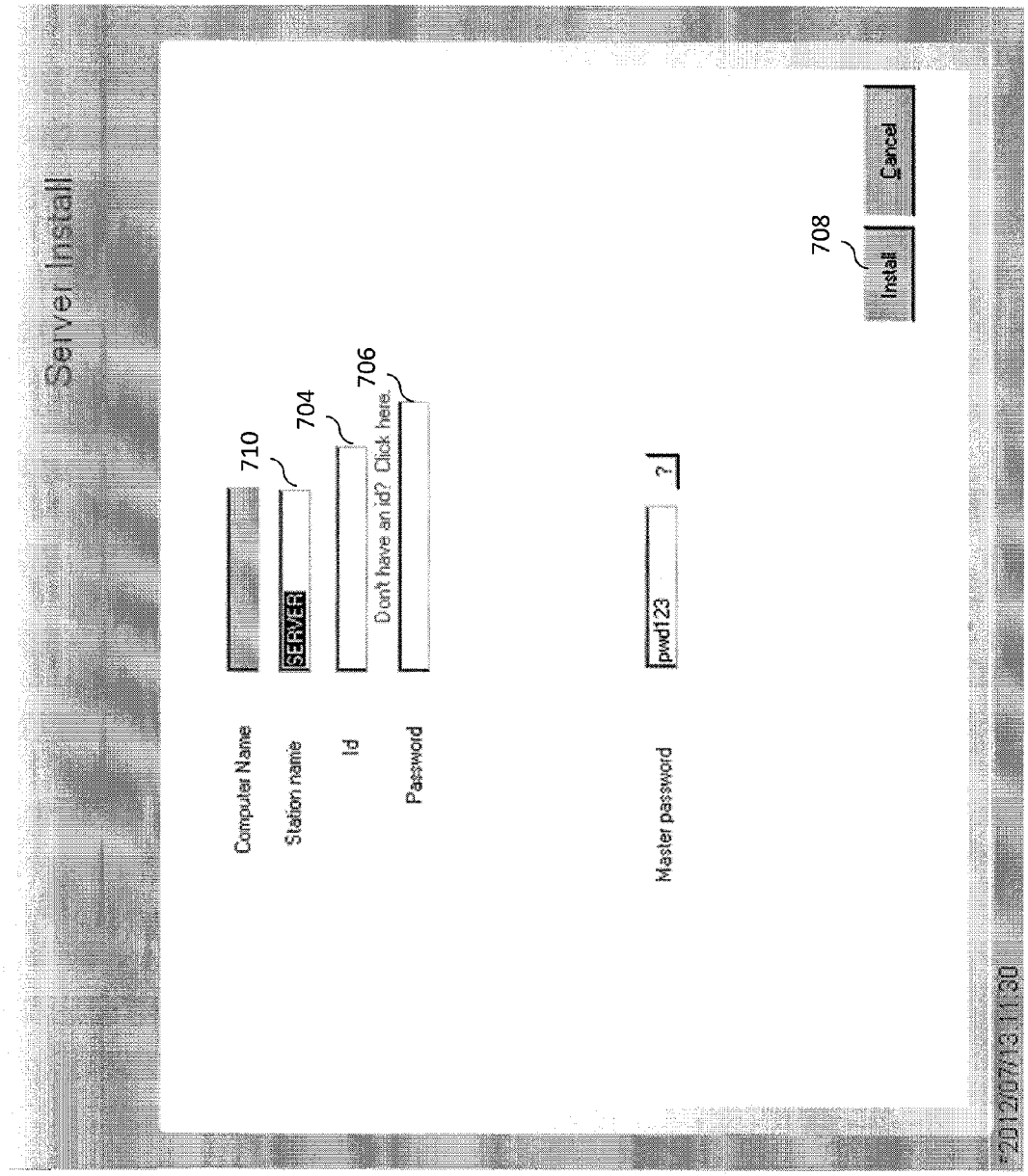
FIG. 7 is an embodiment of a schematic diagram illustrating a user interface for installing an application that connects to an application store to obtain location information.

FIGS. 6-8 illustrate a software application being installed at a particular location. For example, a user can elect to install a point of sale terminal software application. The system can be configured to display user interface 602 in order to guide the user through the installation process. For example, the user can be provided different options for installing the software application. As illustrated in FIG. 6, the user can either install the software at the server by selecting the installed server button 604, or the user can elect to install the software at a particular station by selecting the install station button 606. As illustrated in FIG. 7, the system can be configured to display an installation user interface 706 based on the user's selection. For example, as illustrated in FIG. 7, the user elected to install the software at the server. In an embodiment, the system can be configured to retrieve from the database location data that has been linked to a particular account at a software application store. By accessing the location data linked to the account, the system can be configured to display the possible locations for installing the server software. In order to access the location data stored on the database, the system can be configured to require that the user log in to the system. For example, the system can require that the user provide a login name in text field 704 as well as a password 706 for accessing the application store in order to obtain the location data stored at the database. Additionally, the system can be required to request that the user provide a station name in text field 710 in order to uniquely identify the software application installation at a particular location.

Figure 8A:
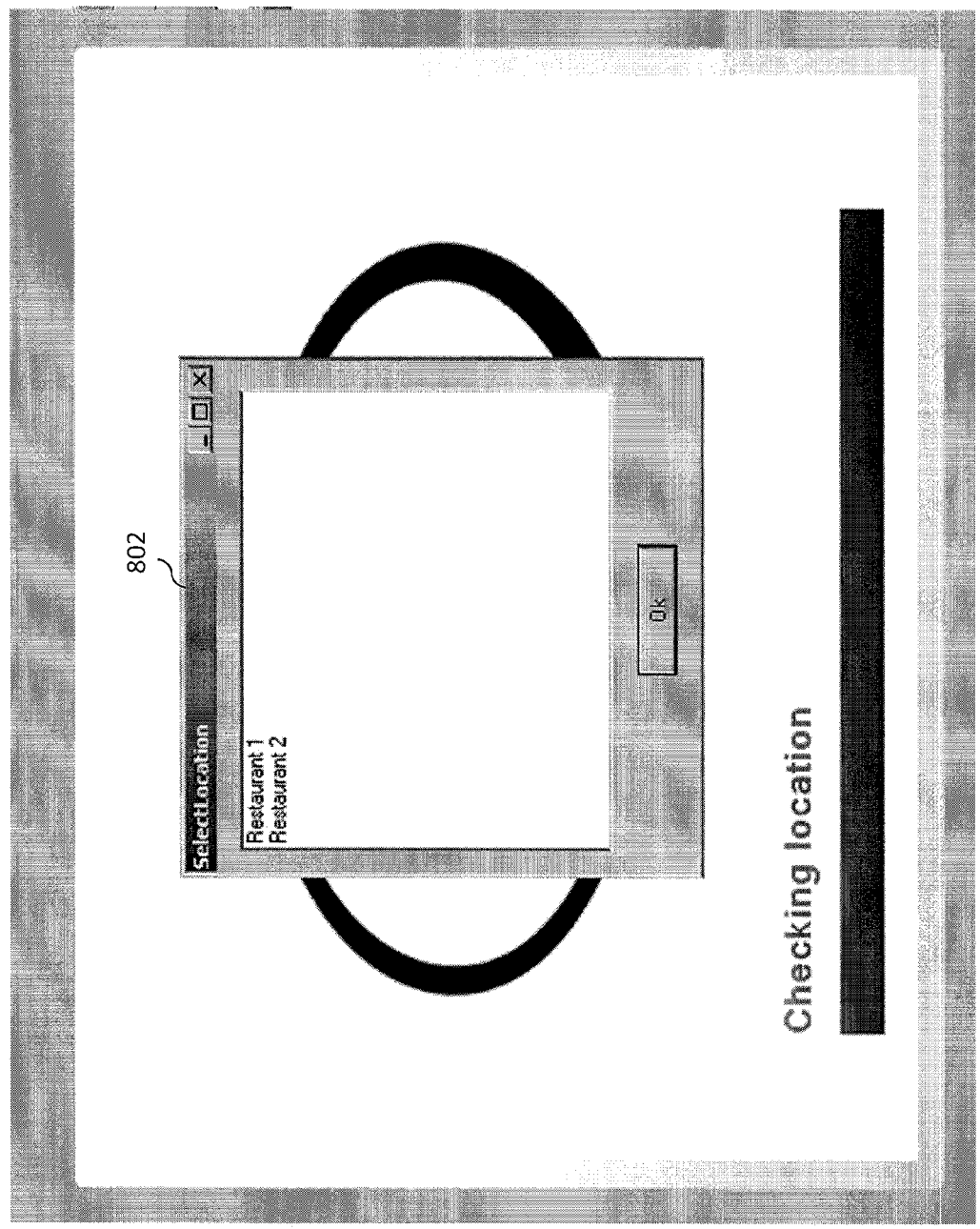
FIGS. 8A-8B is an embodiment of a schematic diagram illustrating a user interface for installing an application at a particular location.
Figure 8B:
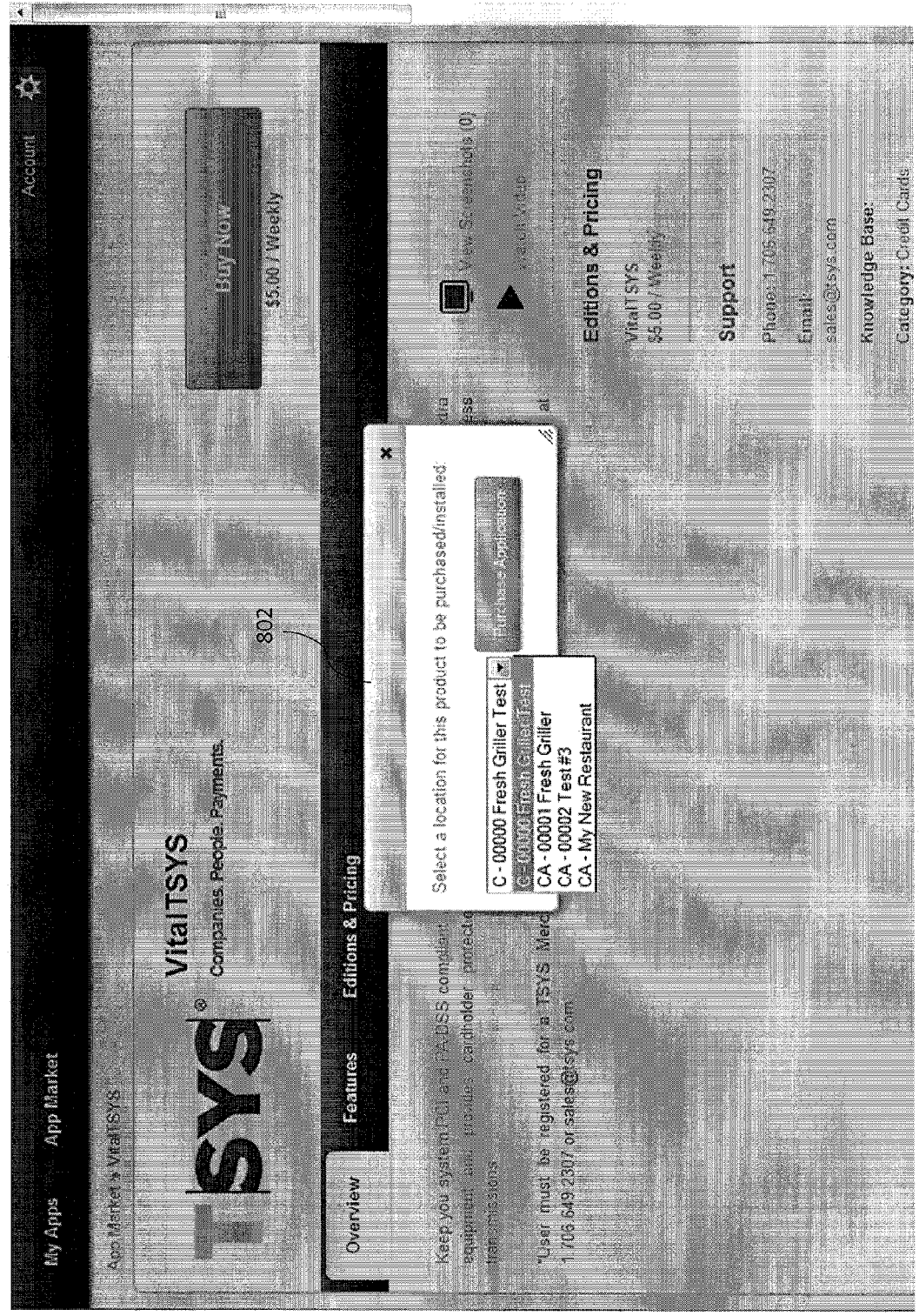
Figure 9:
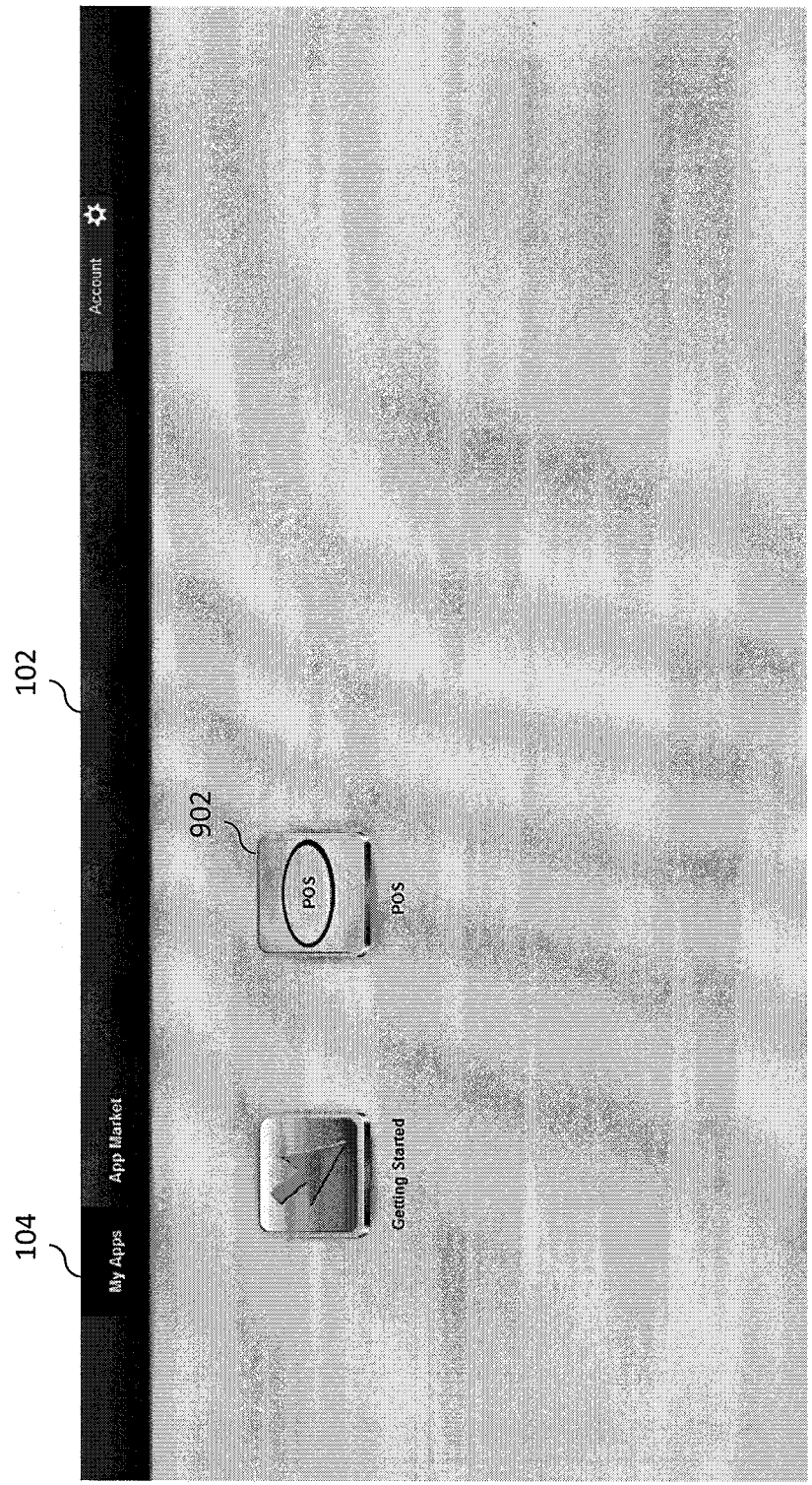
FIG. 9 is an embodiment of a schematic diagram illustrating a user interface of an application store configured to manage applications that have been purchased by a user.

FIGS. 8A-8B illustrate a secondary window that the system can generate based on accessing the location data from the database. In an embodiment, the system can be configured to display to the user secondary window 802 in order to provide the user with a listing of the locations that have been linked or associated with the account at the application store. As illustrated in FIG. 8A, the system has identified two locations that have been associated with the account. As illustrated in FIG. 8B, the system has identified four locations that have been associated with the account. Based on reviewing the available locations, the user can select a particular location for purchasing and/or installing the software application. In an embodiment, the system can be configured to store in a database the location where the particular software application was installed. The system can utilize this data in the database to display a listing of software applications that the user has obtained or purchased and/or installed at particular locations or facilities. As illustrated in FIG. 9, the user interface 102 can be configured to display to the user software applications that were previously purchased or downloaded or accessed. For example, user interface 102 illustrates that the user has installed the point of sale (POS) software application previously. The listing of software applications previously accessed, downloaded or purchased can be provided to the user when the user selects the "my apps" button 104.

Figure 10:
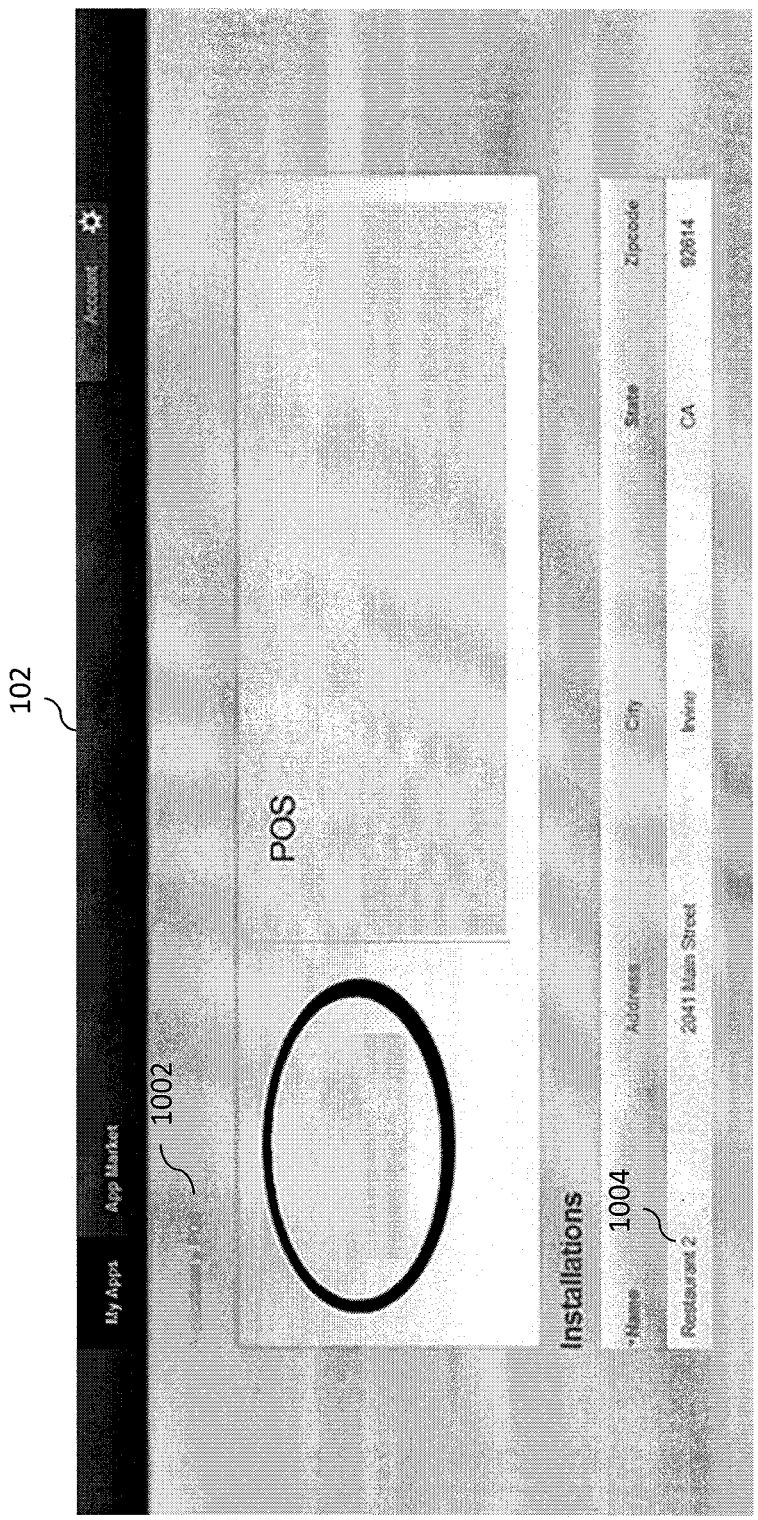
FIG. 10 is an embodiment of a schematic diagram illustrating a user interface for managing the locations where an application is installed.
Figure 11:
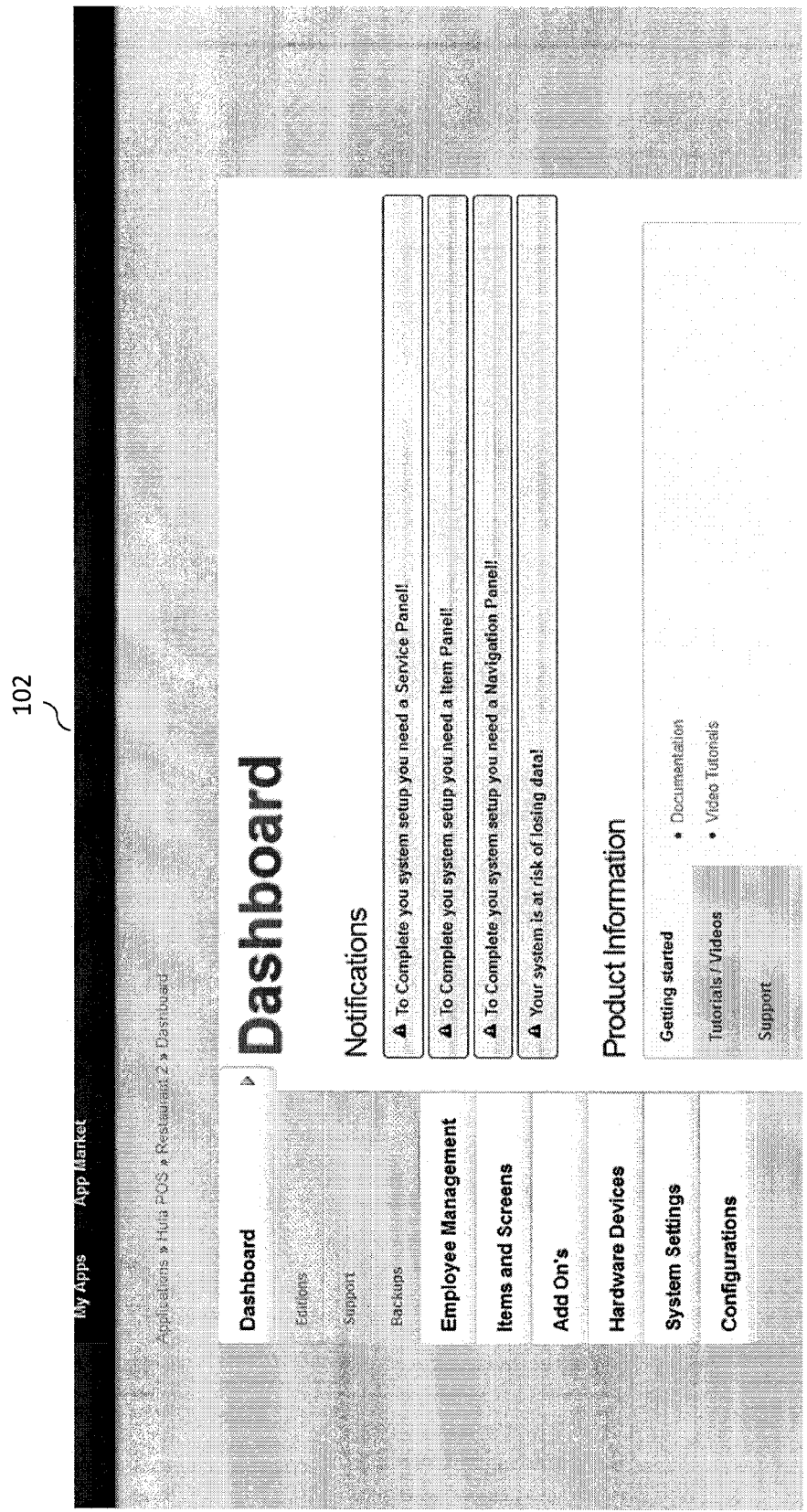
FIG. 11 is an embodiment of a schematic diagram illustrating a user interface for controlling particular features of an application that is installed at a specific location.

In an embodiment, the user can select the software application that has been previously installed at a particular location. As illustrated in FIG. 10, the system can be configured to display to the user the software application and a description of the software application. Additionally, the system can be configured to display to the user a listing of locations where the software application has been installed or is accessible. For example, in FIG. 10, the user interface 102 shows a listing 1004 of locations and/or facilities where the POS software application is installed or is accessible. In this case, only restaurant 2 location has access to the POS software application. By clicking on the location listed in the listing, a user can review and change the features and options of the application for that particular location. In other words, changes to the features and/or options of the software application will only affect the software application as it is operated at the selected location and will not affect the features and options of the software application operating at a different location. The ability to manage software application features and options through an application store from a central location is to reduce the administrative burden for managing software applications across multiple locations that can be remotely located and can further comprise a plurality of computing devices. As illustrated in FIG. 11, the user interface 102 can be configured to display a dashboard of the features and options and settings of the software application for the particular location, which in this case is restaurant 2.

Figure 12:
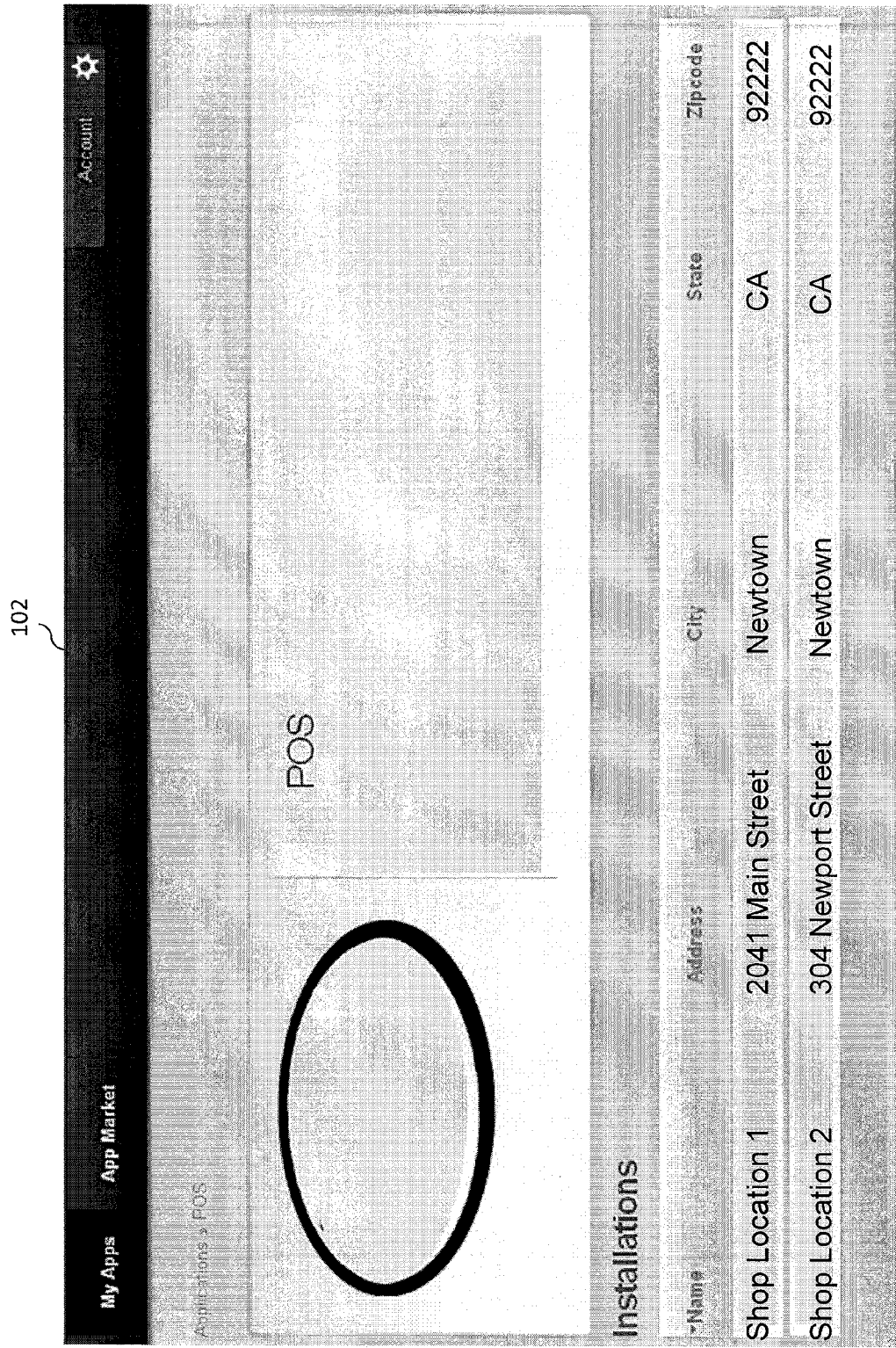
FIG. 12 is an embodiment of a schematic diagram illustrating a user interface of an application showing locations where the application is installed.
Figure 13:
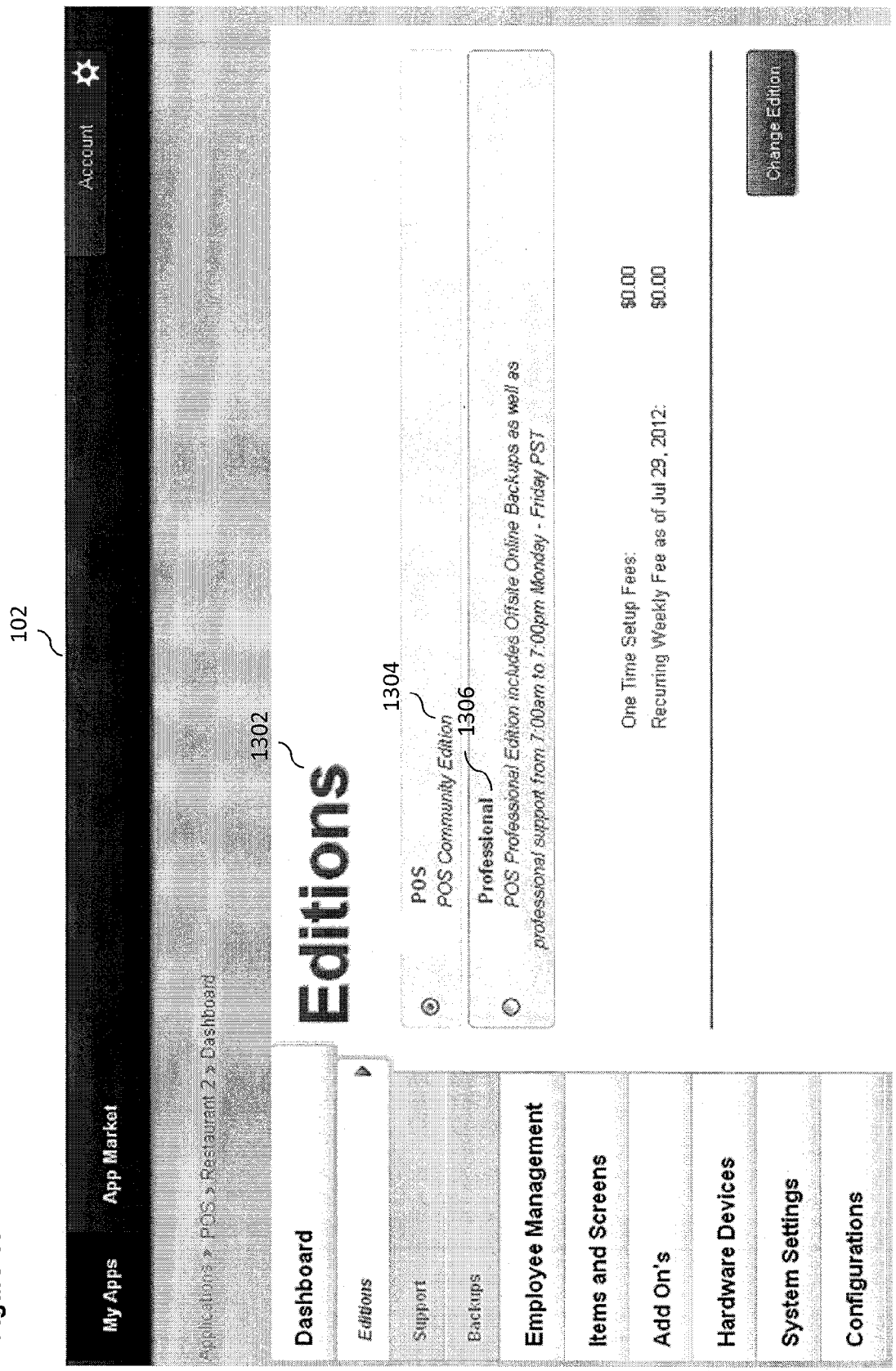
FIG. 13 is an embodiment of a schematic diagram illustrating a user interface for configuring a particular version of an application to be installed at a particular location.

In addition to managing software installed at various locations or facilities, and managing the options and settings of the software application at a particular location or facility, the system can also be configured to manage different software application versions installed across multiple locations or facilities. Additionally, the system can be configured to manage security settings for various users of particular software applications installed at various locations or facilities. As illustrated in FIG. 12, the user interface 102 of the app store illustrates that the POS software application is installed at a plurality of locations, specifically shop location 1, and shop location 2. The system can allow the user to select one or more of the locations in order to set the software application version to be installed or made accessible by the one or more selected locations. As illustrated in FIG. 12, the user interface 102 can be configured to display various addition options for a particular software application. For example, the POS software application can be installed as a community addition/version 1304 or the POS software can be installed as a professional version 1306. By selecting the desired version to be installed, the system can be configured to install the selected software application version only at a particular location. In this example, the selected software application version will only be installed at restaurant 2.

In addition to being able to control the software application version to be installed at a particular location, the system can also be configured to control access to the software application by a plurality of users or employees or workers. As illustrated in FIG. 14, the user interface 102 can be configured to display a plurality of text fields for the user to input employee or worker data for controlling access to various software applications. For example, the system can be configured to receive from the user data such as, first name of the employee, last name of the employee, employee ID number, employee card number, whether an employee card is required in order to access the software, whether an employee card is required for clocking in and clocking out of the software, the access level associated with the employee, a pin number required by the employee for accessing the software, a driver's license number for the employee, the driver's license expiration date, any external reference number, whether the employee is allowed to sign in to the software application without clocking in, whether the software application should deny sign in for the particular employee, whether the software application should deny all access to the employee for the entire application, whether the employee is still in training, and a job code for the employee. Other criteria may be utilized for controlling an employee's access to a particular software application, other criteria includes but is not limited to time of day, calendar date, level of busyness at a location or facility, whether a manager is accessible, whether the situation is an emergency, and any other criteria.

Figure 15:
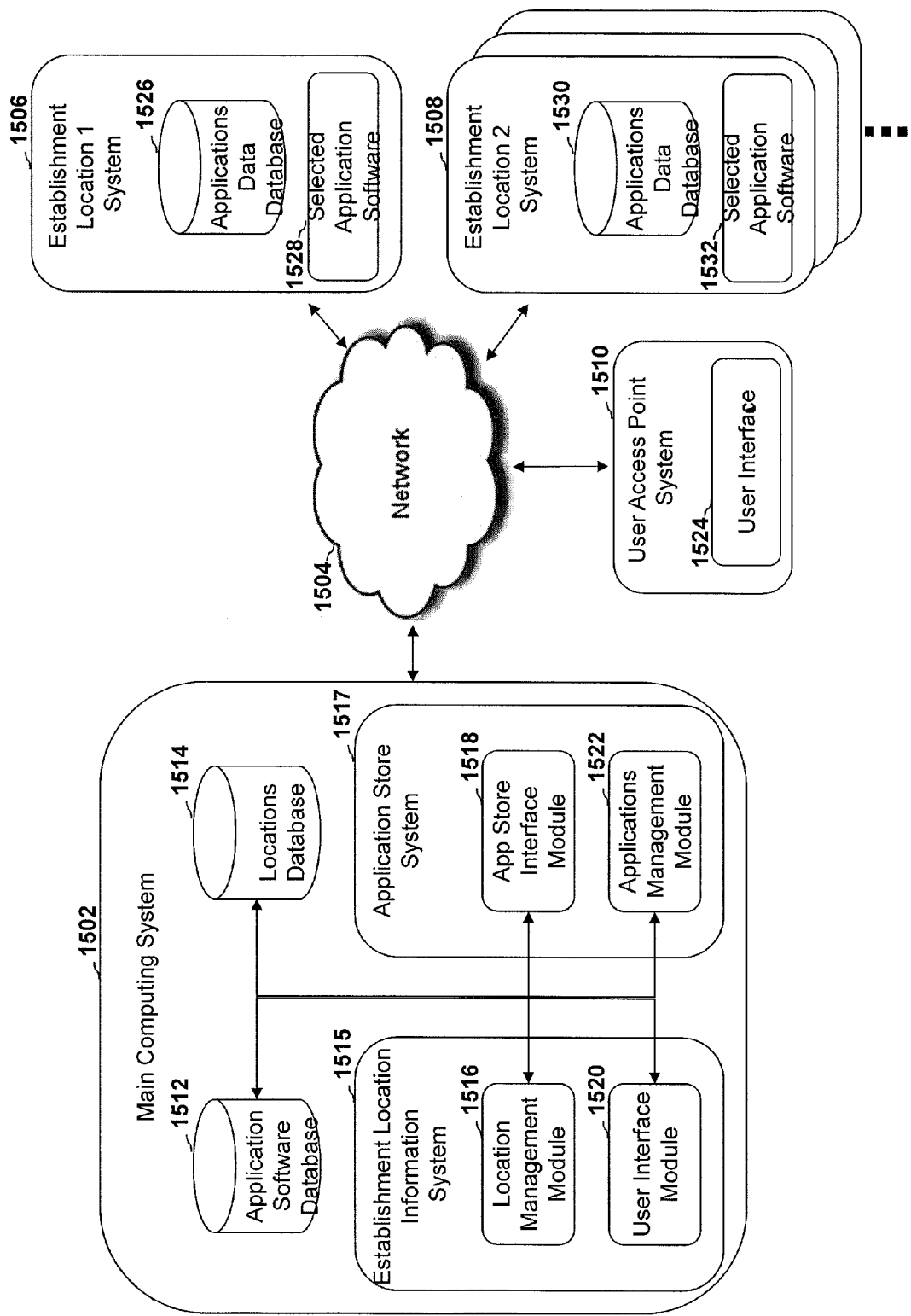
FIG. 15 is a block diagram depicting a high-level overview of an embodiment of a system for managing applications based on location and/or other criteria.

FIG. 15 illustrates a block diagram of a high level overview of an embodiment of a system for managing applications based on location and/or other criteria. In the depicted embodiment, an electronic network 1504 connects a main computing system 1502 with a user access point system 1510, an establishment location 1 system 1506 and a plurality of other establishment location systems 1508. FIG. 15 illustrates an embodiment of various components of the system for managing software applications. It should be noted that the various components illustrated in FIG. 15 are merely for illustrative purposes only and that the arrangement, order, location, and/or existence of the features, components, modules, characteristics, operations, or the like can all be changed without deviating from the spirit of the invention.

The network 1504 may include one or more internet connections, a secure peer-to-peer connection, secured socket layer connections over the internet, virtual private network connections over the internet, or any other secure connections over the internet, private network connections, dedicated network connections, wireless or cellular connections, or the like or any combination of the foregoing.

In an embodiment the main computing system 1502 can comprise an application software database 1512 configured to store and provide access to software applications that are available for purchase and/or download and/or access by a user. The main computing system 1502 can also comprise a locations database 1514. In an embodiment, the locations database 1514 is configured to store location data provided by a user to be associated to particular accounts in the application store. In an embodiment, the main computing system 1502 can be configured to comprise an establishment location information system 1515. In an embodiment, the establishment location information system 1515 is configured to display and/or receive establishment location data associated with a particular user. The establishment location information system 1515 can comprise a location management module 1516 and a user interface module 1520. The location management module 1516 can be configured to electronically access and store establishment data in a locations database 1514. The user interface module 1520 can be configured to electronically connect over a network connection in order to display and obtain data relating to listing of the one or more establishment locations associated with a user.

The main computing system 1502 can be configured to comprise an application store system 1517. The application store system 1517 can be configured to display and/or manage an application store for providing and/or selling software applications to users. The application store system 1517 can comprise an app store interface module 1518 that is configured to display a user interface for allowing a user to interact with the app store. In an embodiment the app store interface module 1518 can be configured to display the various software applications that are available for purchase and/or download by a user. The app store interface module 1518 can also be configured to receive input data from a user, and such input data can comprise but is not limited to a selection of a software application for installation, location data where the selected software application should be installed, user information for users that may have access to the selected software application, security level settings for a particular user, application version type for the application to be installed at a particular location, and any other criteria associated with managing a software application across a plurality of locations and/or computing devices. The application store system 1517 can also comprise an application management module 1522. The application management module can be configured to allow the user to access the software application and to electronically record in the locations database that the establishment location selection is permitted to access the software application selection.

The user access point system 1510 can comprise a user interface 1524. The user interface can be configured to display and retrieve data from a user. In an embodiment, the user access point system 1510 can be configured to allow a user and/or owner to access a particular account at the app store. In an embodiment, the user can utilize the user interface 1524 to control, manage and/or administer various software applications installed across a plurality of locations, mobile devices, users/employees, version types of a software application, and any other criteria for managing software applications.

The establishment location systems 1506 and 1508 can comprise an applications data database 1526, 1530 for storing software applications installed, downloaded or made accessible at the particular establishment location. The establishment location systems 1506, 1508 can also comprise the selected software application 1528, 1532. In an embodiment, the selected software application 1528, 1532 is connected to the applications database 1526, 1530 in order to store and/or retrieve software application data from the database.

Figure 16:
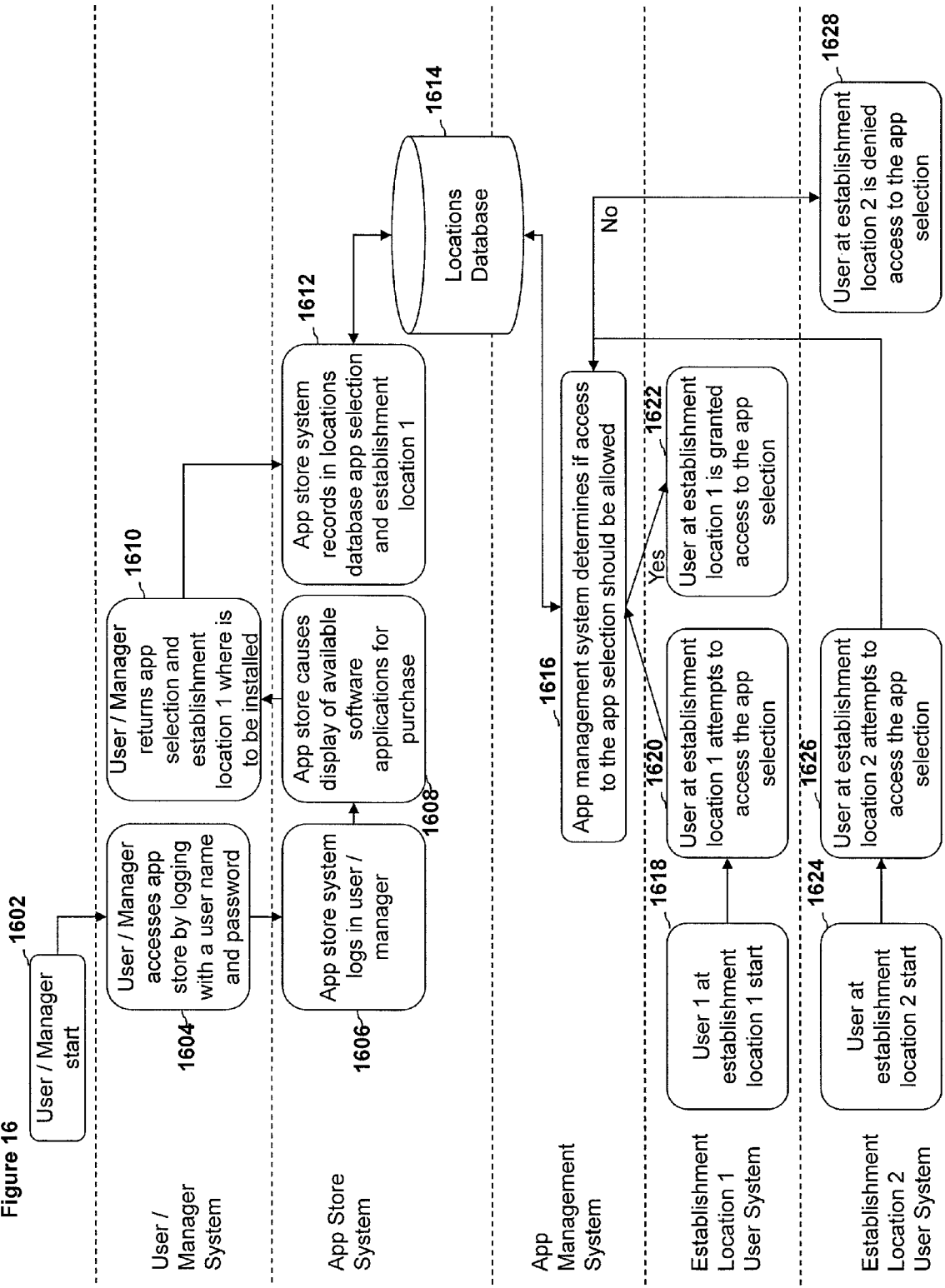
FIG. 16 depicts an embodiment of a process flow diagram illustrating an example of managing access to an application.

FIG. 16 depicts an embodiment of a process flow diagram illustrating an example of managing access to a software application. In this example, the system is configured to allow a user to access the software application at location 1 and/or one or more computing devices thereof, while preventing the same and/or different user from accessing the application at location 2 and/or one or more computing devices thereof. In other words, the user/manager is installing the software application only at establishment location 1 and/or one or more computing devices thereof and not at establishment location 2 and/or one or more computing devices thereof. At block 1602, a user or manager starts the process by accessing a user interface for the app store at block 1604. The user provides a user name and password and any other authentication information in order to successfully log into the application store. At block 1606, the application store system logs the user into the user's account.

At block 1608, the application store system causes display of available software applications for purchase, download, installation, and/or operation. At block 1610, the user/manager selects an application and a location where the application is to be downloaded, installed, and/or otherwise operated. For example, a web-based application and/or software can be operated by one or more devices at a particular location without downloading and/or installation. The selected location can comprise one or more computing devices. At block 1612, the application store system is configured to record in a locations database 1614 the selected software application and the location selected for installation. At block 1612, the system can optionally be configured to store in the locations database 1614 data relating to which users/employees may access the software application at the selected location. For example, the user or manager can provide access data during the process of selecting a software application, and such access data can be stored in the locations database or some other database that is accessible by the system.

At block 1618, a user (user 1) at establishment location 1 starts the process of trying to log into the application via a system located and/or otherwise associated with establishment location 1. At block 1620, user 1 at establishment location 1 provides login information to the system in order to access the software application. In an embodiment, the system can be configured to automatically detect the establishment location from where user 1is logging in from, and in other embodiments, user 1 provides the establishment location to the system. At block 1616, the application management system determines if access to the software application should be allowed based on the login information and the location information. At block 1622, user 1 is granted access to the software application at establishment location 1 based on the determination made by the application management system at block 1616.

At block 1624, user 1 and/or another user (user 2) at establishment location 2 starts the process of trying to access the software application from establishment location 2 via a system located and/or otherwise associated with establishment location 2. In an embodiment, the system can be configured to automatically detect the establishment location from where user 1 and/or 2 is logging in from, and in other embodiments, user 1 and/or 2 provides the establishment location to the system. At block 1626, user 1 and/or 2 at establishment location 2 provides login information in order to access the software application. At block 1616, the application management system determines if access to the application should be allowed based on the login information and the location information. In this example, the application management system has determined that user 1 and/or 2 does not have access to the application from establishment location number 2 because the user/manager elected not to install the software application at the establishment location 2. At block 1628, user 1 and/or 2 at establishment location 2 is denied access to the software application.

Figure 17:
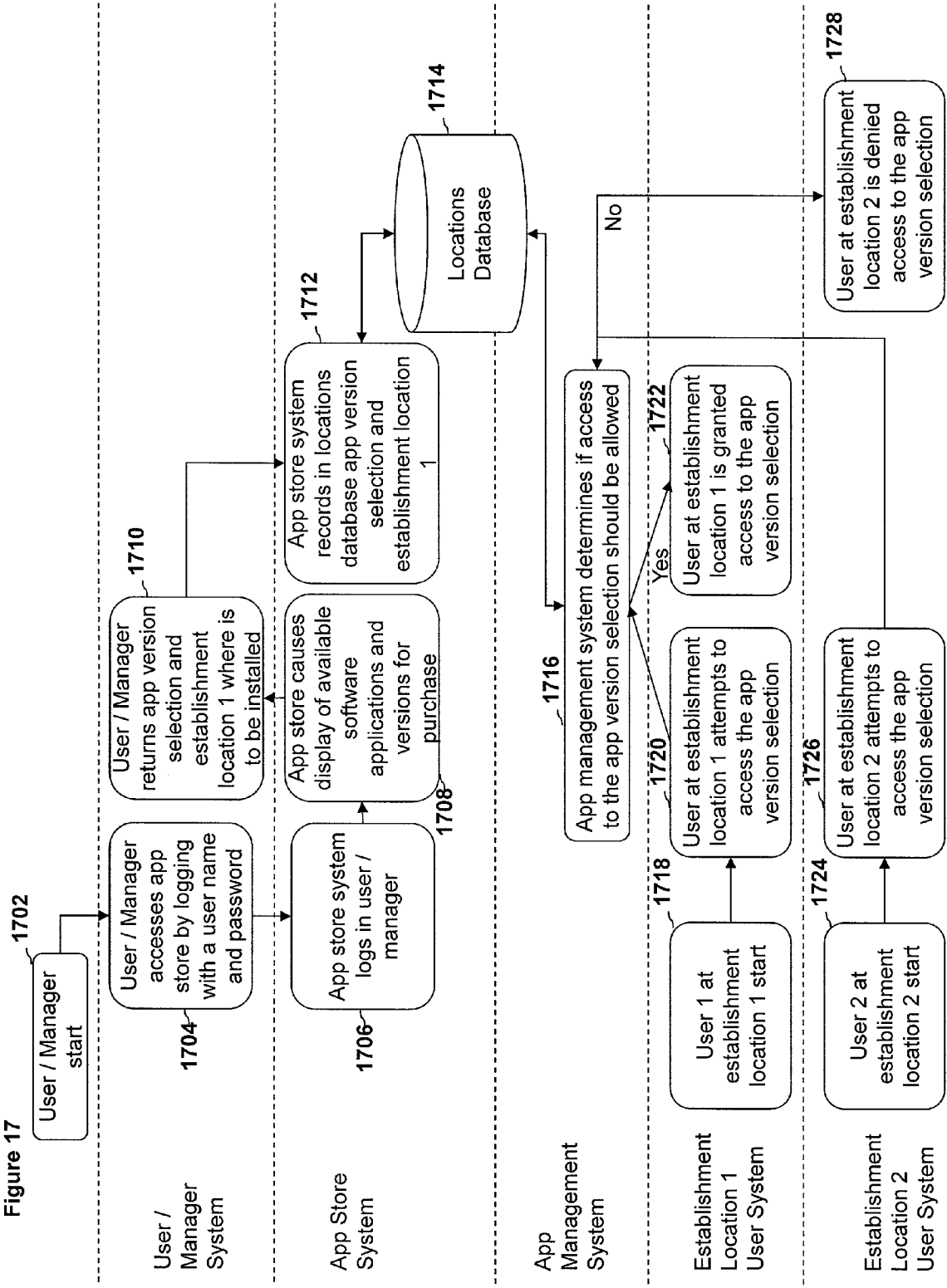
FIG. 17 depicts an embodiment of a process flow diagram illustrating an example of managing an application.

FIG. 17 depicts an embodiment of a process flow diagram illustrating another example of managing access to a software application that is similar to the process flow illustrated in FIG. 16. In this example the system is configured to allow a user (user 1) to access a particular version of a software application at location 1 while preventing another user (user 2) from accessing the same version of the software application at location2. Similarly, the system can be configured to upgrade/downgrade a particular version of a software application at location 1 and allow user 1 to access the upgraded/downgraded version, while preventing user 2 from accessing the upgraded/downgraded version at location 2. At block 1702, a user or manager starts the process by accessing a user interface for the app store at block 1704. The user provides a user name and password and any other authentication information in order to successfully log into the application store. At block 1706, the application store system logs the user into the user's account.

At block 1708, the application store system causes display of available software applications and versions of the software applications for purchase, download, installation, and/or operation. At block 1710, the user/manager selects a software application, a version of the software application, and a location where the software application is to be downloaded, installed, and/or otherwise operated. For example, the user/manager can select the professional version of the POS software to be installed at establishment location 1 but not at establishment location 2. At block 1712, the application store system is configured to record in a locations database 1714 the selected software application, the software application version, and the location selected for installation. At block 1712, the system can be configured to store in the locations database 1714 data relating to which users/employees may access the software application at the selected location. For example, the user or manager can provide access data during the process of selecting a software application, and such access data can be stored in the locations database or some other database that is accessible by the system.

At block 1718, user 1 at establishment location 1 starts the process of trying to log into the software application. At block 1720, user 1 at establishment location 1 provides login information to the system in order to access the professional version of the POS software application. In an embodiment, the system can be configured to automatically detect the establishment location from where user 1 is logging in from, and in other embodiments, user 1 provides the establishment location to the system. At block 1716, the application management system determines if access to the professional version of the POS software application should be allowed based on the login information and/or the establishment location information. At block 1722, user 1 is granted access to the version of the software application at establishment location 1 based on the determination made by the application management system at block 1616.

At block 1724, user 2 at establishment location 2 starts the process of trying to access the software application from establishment location 2. At block 1726, the user at establishment location 2 (user 2) provides login information in order to access the software application. In an embodiment, the system can be configured to automatically detect the establishment location from where user 2 is logging in from, and in other embodiments, user 2 provides the establishment location to the system. At block 1716, the application management system determines if access to the application should be allowed based on the login information and/or the location information. In this example, the application management system has determined that user 2 does not have access to the software application from establishment location 2. At block 1728, user 2 at establishment location 2 is denied access to the software application.

Figure 18:
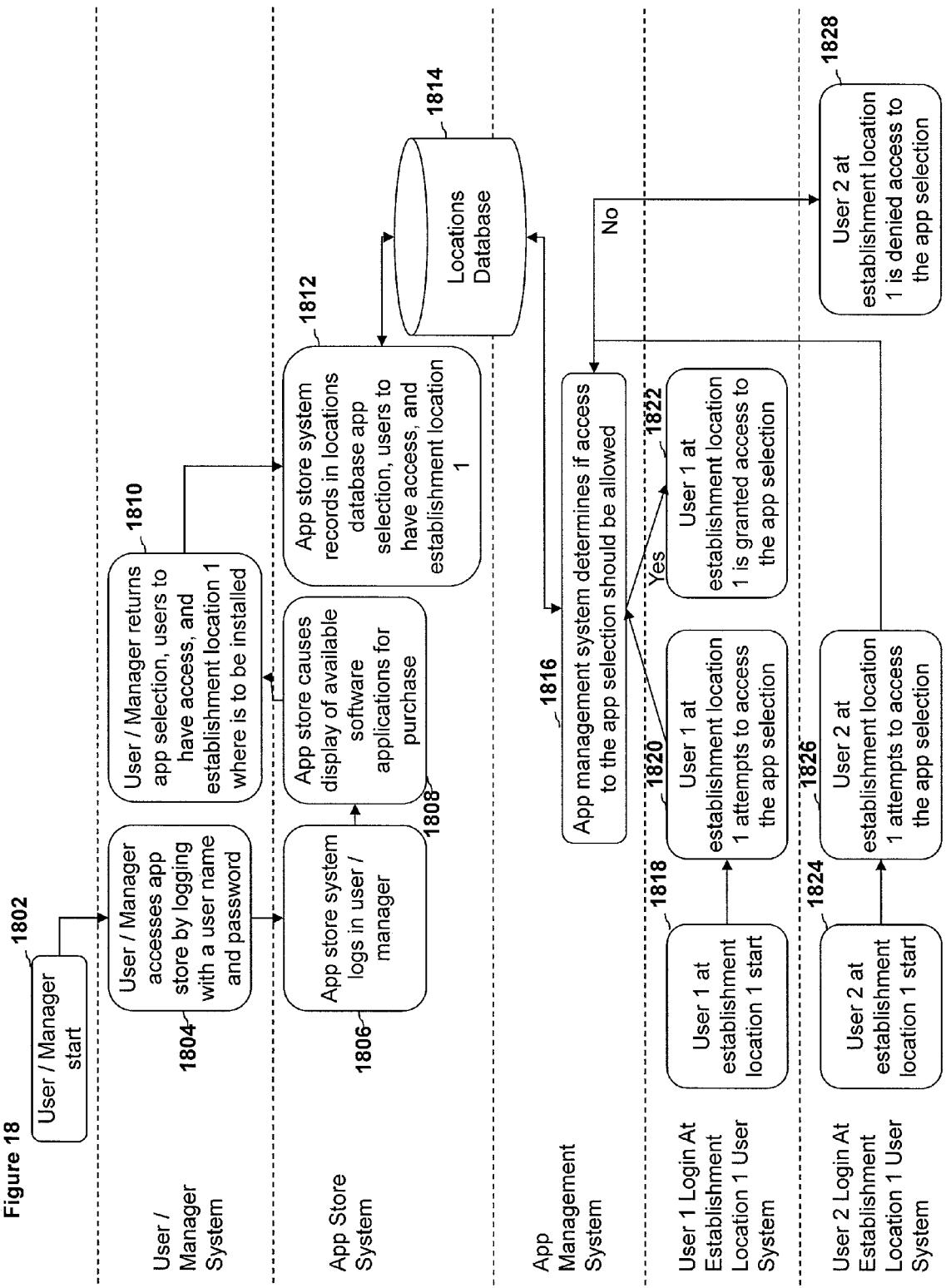
FIG. 18 depicts an embodiment of a process flow diagram illustrating an example of managing an application.

FIG. 18 depicts an embodiment of a process flow diagram illustrating another example of managing access to a software application that is similar to the process flow illustrated in FIGS. 16 and 17. In this example the system is configured to allow a first user (user 1) to access a particular software application at location 1 while preventing a second user (user 2) from accessing the same software application from the same location, location 1. At block 1802, a user or manager starts the process by accessing a user interface for the app store at block 1804. The user provides a user name and password and any other authentication information in order to successfully log into the application store. At block 1806, the application store system logs the user into the user's account.

At block 1808, the application store system causes display of available software applications and versions of the software applications for purchase, download, installation, and/or operation. At block 1810, the user/manager selects a software application, a location where the software application is to be downloaded, installed, and/or otherwise operated and users that may access the software application. For example, the user/manager selects the POS software to be installed at establishment location 1, and elects to provide user 1 access to the software application but not to allow user 2 to access the software application even from establishment location 1. At block 1812, the application store system is configured to record in a locations database 1814 the selected software application and the location selected for installation. At block 1812, the system can be configured to store in the locations database 1814 data relating to which users/employees may access the software application at the selected location. For example, the user or manager can provide access data during the process of selecting a software application, and such access data can be stored in the locations database or some other database that is accessible by the system.

At block 1818, user 1 at establishment location 1 starts the process of trying to log into the software application. At block 1820, user 1 at establishment location 1 provides login information to the system in order to access the POS software application. In an embodiment, the system can be configured to automatically detect the establishment location from where user 1 is logging in from, and in other embodiments, user 1 provides the establishment location to the system. At block 1816, the application management system determines if access to the POS software application should be allowed based on the login information and/or the establishment location information. At block 1822, user 1 is granted access to the software application at establishment location 1 based on the determination made by the application management system at block 1816.

At block 1824, user 2 at establishment location 1, which is the same location as user 1, starts the process of trying to access the software application from establishment location 1. At block 1826, user 2 at establishment location 1 provides login information in order to access the software application. In an embodiment, the system can be configured to automatically detect the establishment location from where user 2 is logging in from, and in other embodiments, user 2 provides the establishment location to the system. At block 1816, the application management system determines if access to the application should be allowed based on the login information and/or the location information. In this example, the application management system has determined that user 2 does not have access to the software application from establishment location 1. At block 1828, user 2 at establishment location 1 is denied access to the software application.

Figure 19:
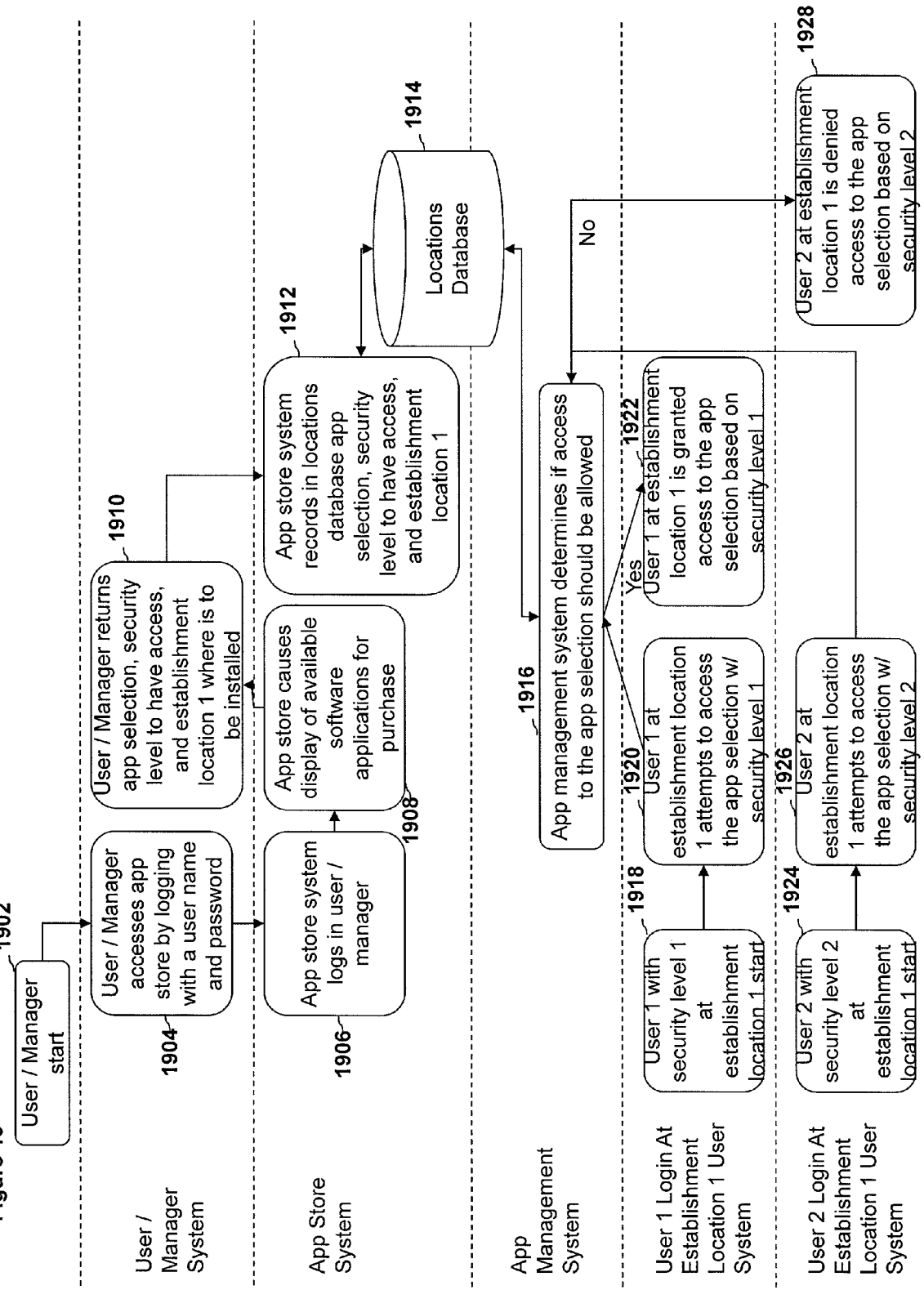
FIG. 19 depicts an embodiment of a process flow diagram illustrating an example of managing an application.

FIG. 19 depicts an embodiment of a process flow diagram illustrating another example of managing access to a software application that is similar to the process flow illustrated in FIGS. 16, 17, and 18. In this example, the system is configured to allow a first user (user 1) to access a particular software application at location 1 because user 1 has the appropriate security level 1 clearance, while the system is configured to prevent a second user (user 2) from accessing the same software application at location 1 because user 2 has a security level 2 clearance, which is not an appropriate security level for accessing the software application. At block 1902, a user or manager starts the process by accessing a user interface for the app store at block 1904. The user provides a user name and password and any other authentication information in order to successfully log into the application store. At block 1906, the application store system logs the user into the user's account.

At block 1908, the application store system causes display of available software applications and versions of the software applications for purchase, download, installation, and/or operation. At block 1910, the user/manager selects a software application, a location where the software application is to be downloaded, installed, and/or otherwise operated, and the appropriate security clearance level that users are required to have in order to access the software application. For example, the user/manager selects the POS software to be installed at establishment location 1, and elects to allow all users with a security clearance level 1 with access to the software application. At block 1912, the application store system is configured to record in a locations database 1914 the selected software application and the location selected for installation. At block 1912, the system can be configured to store in the locations database 1914 data relating to which users/employees may access the software application at the selected location. For example, the user or manager, during the process of selecting a software application, can provide access data that includes the security clearance level required for users to access the software application, and such access data can be stored in the locations database or some other database that is accessible by the system.

At block 1918, user 1 at establishment location 1 starts the process of trying to log into the software application. At block 1920, user 1 at establishment location 1 provides login information to the system in order to access the POS software application. In an embodiment, the system can be configured to automatically detect the security clearance level of user 1 based on the login information, and in other embodiments, user 1 provides the security clearance level, for example, by swiping an employee card, typing in a security code, or the like, or a combination of the foregoing. At block 1916, the application management system determines if access to the POS software application should be allowed based on the login information and/or the security clearance level information. At block 1922, user 1 is granted access to the software application at establishment location 1 based on the determination made by the application management system at block 1616.

At block 1924, user 2 at establishment location 1 starts the process of trying to access the software application from establishment location 1. At block 1926, the user at establishment location 1 provides login information in order to access the software application. In an embodiment, the system can be configured to automatically detect the security clearance level of the user 2 based on the login information, and in other embodiments, the user 2 provides the security clearance level, for example, by swiping an employee card, typing in a security code, or the like, or a combination of the foregoing. At block 1916, the application management system determines if access to the application should be allowed based on the login information and/or the security clearance level information. In this example, the application management system has determined that the user 2 does not have access to the software application from establishment location 1. At block 1928, the user 2 at establishment location 1 is denied access to the software application.

Figure 20:
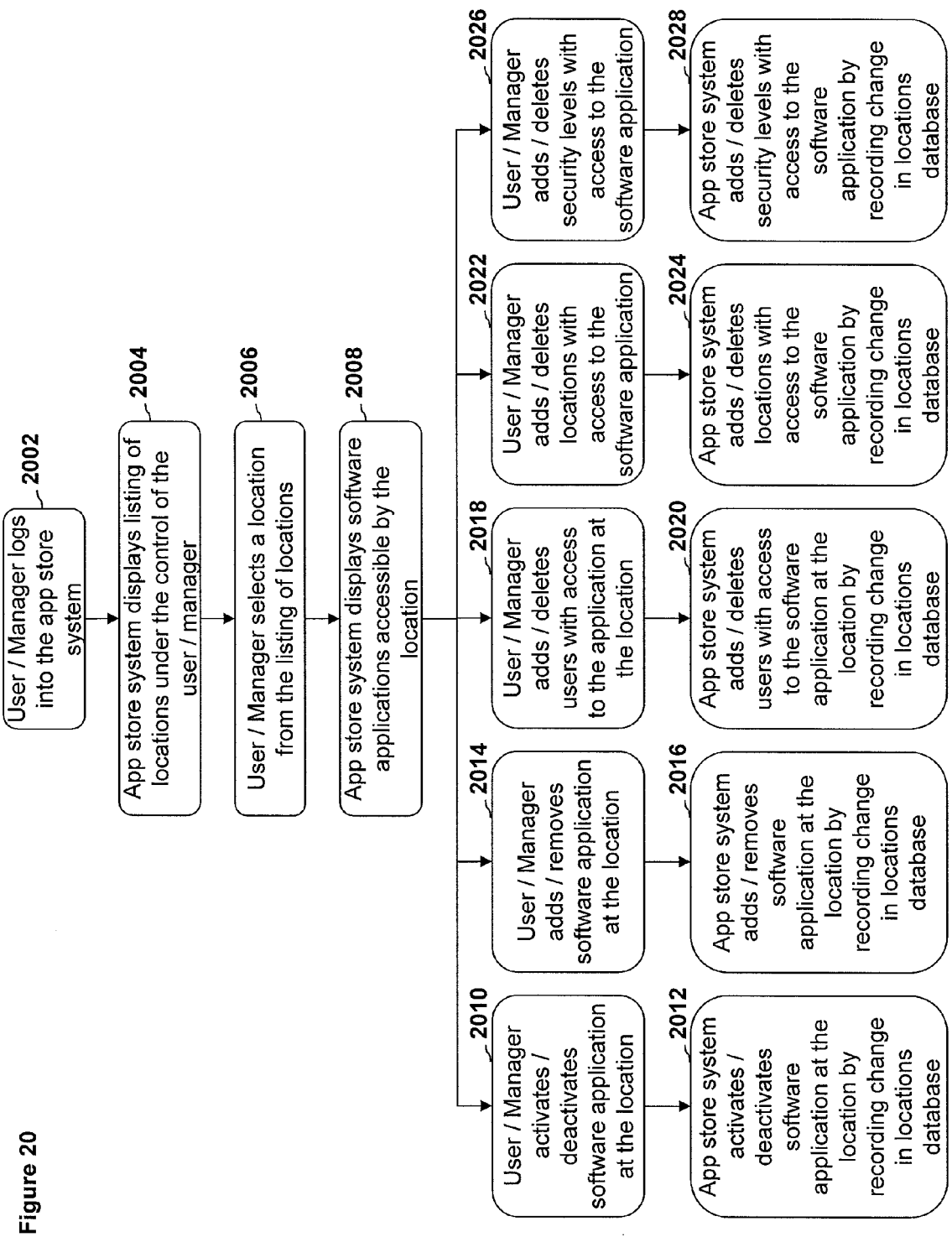
FIG. 20 depicts an embodiment of a process flow diagram illustrating an example of managing an application.

FIG. 20 depicts an embodiment of a process flow diagram illustrating an example of managing a software application from an application store. In an embodiment, a user can manage a software application based on a variety of criteria. The process can begin at block 2002 wherein the user logs into the application store by providing a user name, password, and/or other authentication information. At block 2004, the application store can be configured to display a listing of locations or establishments that under the management or control of the user. At block 2006, the user can input into the system a selection of location from the listing of locations. At block 2008, the application store can be configured to display a plurality of software applications that are available for purchase, access, download, or otherwise.

At block 2010, the user can utilize the application store to activate or deactivate the selected software application at the selected location. At block 2012, the application store can be configured to activate or deactivate the selected software application at the selected location. In an embodiment, this change is stored in the locations database. At block 2014, the user can utilize the application store to add or remove the selected software application at the selected location. At block 2016, the application store can be configured to add or remove the selected software application at the selected location. In an embodiment, this change is stored in the locations database. At block 2018, the user can utilize the application store to add or delete users with access to the selected software application at the selected location. At block 2020, the application store can be configured to add or delete users with access to the selected software application at the selected location. In an embodiment, this change is stored in the locations database.

At block 2022, the user can utilize the application store to add or delete the selected location from having access to the selected software application. At block 2024, the application store can be configured to add or delete the selected location from having access to the selected software application. In an embodiment, this change is stored in the locations database. At block 2026, the user can utilize the application store to add or delete security clearance levels that are necessary for accessing the selected software application at the selected location. At block 2012, the application store can be configured to add or delete security clearance levels that are necessary for accessing the selected software application at the selected location. In an embodiment, this change is stored in the locations database.

In an embodiment, the system can be configured to determine access to a software application based on one or more of the criteria disclosed with respect to FIGS. 16-20.

Computing System

Figure 21:
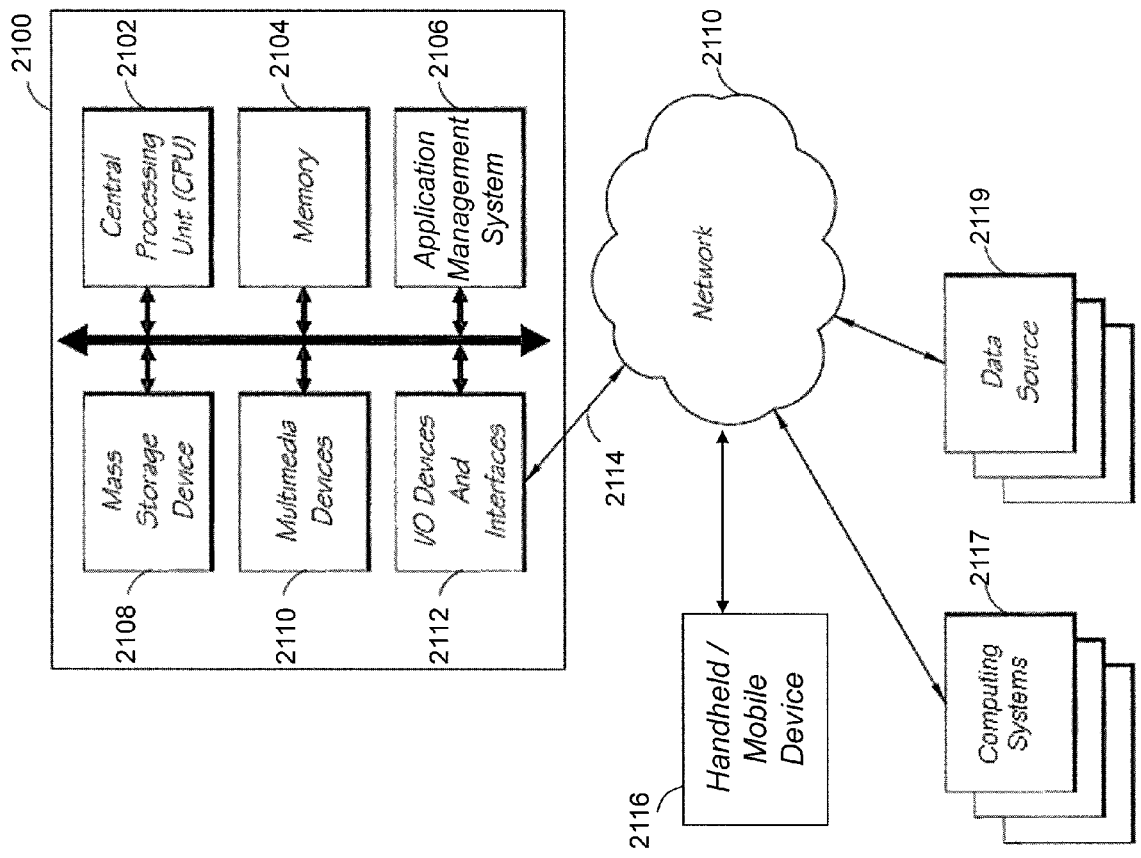
FIG. 21 is a block diagram depicting an embodiment of a computer hardware system configured to run software for implementing one or more embodiments of the application management system described herein.

FIG. 21 is a block diagram depicting an embodiment of a computer hardware system configured to run software for implementing one or more embodiments of the application management system described herein.

In some embodiments, the computer clients and/or servers described above take the form of a computing system 2100 illustrated in FIG. 21, which is a block diagram of one embodiment of a computing system that is in communication with one or more computing systems 2110 and/or one or more data sources 2115 via one or more networks 2108. The computing system 2100 may be used to implement one or more of the systems and methods described herein. In addition, in one embodiment, the computing system 2100 may be configured to manage access or administer a software application. While FIG. 21 illustrates one embodiment of a computing system 2100, it is recognized that the functionality provided for in the components and modules of computing system 2100 may be combined into fewer components and modules or further separated into additional components and modules.

Application Management Module

In one embodiment, the system 2100 comprises an application management system module 2106 that carries out the functions described herein with reference to managing or administering an application, including any one of the access management techniques described above. The application management system module 2106 may be executed on the computing system 2100 by a central processing unit 2104 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 2100 also comprises a mainframe computer suitable for controlling and/or communicating with large databases, performing high volume transaction processing, and generating reports from large databases. The computing system 2100 also comprises a central processing unit ("CPU") 2104, which may comprise a conventional microprocessor. The computing system 2100 further comprises a memory 2105, such as random access memory ("RAM") for temporary storage of information and/or a read only memory ("ROM") for permanent storage of information, and a mass storage device 2101, such as a hard drive, diskette, or optical media storage device. Typically, the modules of the computing system 2100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 2100 comprises one or more commonly available input/output (I/O) devices and interfaces 2103, such as a keyboard, mouse, touchpad, and printer. In one embodiment, the I/O devices and interfaces 2103 comprise one or more display devices, such as a monitor, that allows the visual presentation of data to a user. More particularly, a display device provides for the presentation of GUIs, application software data, and multimedia presentations, for example. In the embodiment of FIG. 21, the I/O devices and interfaces 2103 also provide a communications interface to various external devices. The computing system 2100 may also comprise one or more multimedia devices 2102, such as speakers, video cards, graphics accelerators, and microphones, for example.

Computing System Device/Operating System

The computing system 2100 may run on a variety of computing devices, such as, for example, a server, a Windows server, a Structure Query Language server, a Unix server, a personal computer, a mainframe computer, a laptop computer, a cell phone, a personal digital assistant, a kiosk, an audio player, and so forth. The computing system 2100 is generally controlled and coordinated by operating system software, such as z/OS, Windows 95, Windows 98, Windows NT, Windows 2000, Windows XP, Windows Vista, Windows 7, Linux, BSD, SunOS, Solaris, or other compatible operating systems. In Macintosh systems, the operating system may be any available operating system, such as MAC OS X. In other embodiments, the computing system 2100 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 21, the computing system 2100 is coupled to a network 2108, such as a LAN, WAN, or the Internet, for example, via a wired, wireless, or combination of wired and wireless, communication link 2115. The network 2108 communicates with various computing devices and/or other electronic devices via wired or wireless communication links. In the embodiment of FIG. 21, the network 2108 is communicating with one or more computing systems 2110 and/or one or more data sources 2115.

Access to the application management system module 2106 of the computer system 2100 by computing systems 2110 and/or by data sources 2115 may be through a web-enabled user access point such as the computing systems' 2110 or data source's 2115 personal computer, cellular phone, laptop, or other device capable of connecting to the network 2108. Such a device may have a browser module is implemented as a module that uses text, graphics, audio, video, and other media to present data and to allow interaction with data via the network 2108.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 2103 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 2100 may comprise a physical or logical connection established between a remote microprocessor and a mainframe host computer for the express purpose of uploading, downloading, or viewing interactive data and databases on-line in real time. The remote microprocessor may be operated by an entity operating the computer system 2100, including the client server systems or the main server system, an/or may be operated by one or more of the data sources 2115 and/or one or more of the computing systems. In some embodiments, terminal emulation software may be used on the microprocessor for participating in the micro-mainframe link.

In some embodiments, computing systems 2110 who are internal to an entity operating the computer system 2100 may access the application management system module 2106 internally as an application or process run by the CPU 2104.

User Access Point

In an embodiment, a user access point or user interface 2106 comprises a personal computer, a laptop computer, a cellular phone, a GPS system, a Blackberry® device, a portable computing device, a server, a computer workstation, a local area network of individual computers, an interactive kiosk, a personal digital assistant, an interactive wireless communications device, a handheld computer, an embedded computing device, or the like.

Other Systems

In addition to the systems that are illustrated in FIG. 21, the network 2108 may communicate with other data sources or other computing devices. The computing system 2100 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A computer-implemented method for controlling access to a software application, the computer-implemented method comprising:

receiving, by a computer system through a computer network, an establishment location selection inputted using a user interface, the establishment location selection selected from one or more establishment locations located at different geographic locations and associated with a single user account of a user, the one or more establishment locations stored in a locations database;

receiving, by the computer system through the computer network, a software application selection, the software application selection selected from one or more software applications stored in an applications database and available for download by the single user account of the user;

receiving, by the computer system through the computer network, a version type for the software application selection; and storing, by the computer system, the establishment location selection in the locations database wherein the establishment location selection comprises:

permission rights to access the software application selection; and permission rights to access the version type of the software application, wherein the computer system comprises a computer processor and an electronic non-transitory storage medium.

2. The computer-implemented method of claim 1, further comprising blocking, by the computer system, a second establishment location associated with the user account from electronic access to the software application selection, wherein the blocking electronic access to the software application selection is based on determining whether the locations database indicates that the second establishment location is permitted to access the software application selection.

3. The computer-implemented method of claim 2, wherein the blocking electronic access to the software application selection is performed in real time.

4. The computer-implemented method of claim 1, further comprising blocking, by the computer system, a second establishment location associated with the user account from electronic access to the version type of the software application selection, wherein the blocking electronic access to the version type of the software application selection is based on determining whether the locations database indicates that the second establishment location is permitted to access the version type of the software application selection.

5. The computer-implemented method of claim 4, wherein the blocking electronic access to the version type of the software application selection is performed in real time.

6. The computer-implemented method of claim 1, further comprising:

receiving, by the computer system through the computer network, a computing device selection, the computing device selection selected from one or more computing devices associated with the establishment location selection; and storing, by the computer system, in the locations database that the computing device selection comprises permission rights to access the software application selection.

7. The computer-implemented method of claim 6, further comprising blocking, by the computer system, a second computing device associated with the establishment location selection from electronic access to the software application selection, wherein the blocking electronic access to the software application selection is based on determining whether the locations database indicates that the second computing device is permitted to access the software application selection.

8. The computer-implemented method of claim 7, wherein the blocking electronic access to the software application selection is performed in real time.

9. The computer-implemented method of claim 1, further comprising:

receiving, by the computer system through the computer network, a second establishment location selection where the software application selection is to be installed, the second establishment location selection is selected from the one or more establishment locations associated with the user account of the user; and storing, by the computer system, in the locations database that the second establishment location selection comprises permission rights to access the software application selection.

10. A computer-readable, non-transitory storage medium having a computer program stored thereon for causing a suitably programmed computer system to process by one or more computer processors computer-program code by performing a method for controlling access to a software application when the computer program is executed on the suitably programmed computer system, the method comprising:

receiving, by a computer system through a computer network, an establishment location selection inputted using a user interface, the establishment location selection selected from one or more establishment locations located at different geographic locations and associated with a single user account of a user, the one or more establishment locations stored in a locations database;

receiving, by the computer system through the computer network, a software application selection, the software application selection selected from one or more software applications stored in an applications database and available for download by the single user account of the user;

receiving, by the computer system through the computer network, a version type for the software application selection; and storing, by the computer system, the establishment location selection in the locations database wherein the establishment location selection comprises:

permission rights to access the software application selection; and permission rights to access the version type of the software application, wherein the computer system comprises a computer processor and an electronic non-transitory storage medium.

11. The computer-readable, non-transitory storage medium of claim 10, wherein the method further comprises blocking, by the computer system, a second establishment location associated with the user account from electronic access to the software application selection, wherein the blocking electronic access to the software application selection is based on determining whether the locations database indicates that the second establishment location is permitted to access the software application selection.

12. The computer-readable, non-transitory storage medium of claim 11, wherein the blocking electronic access to the software application selection is performed in real time.

13. The computer-readable, non-transitory storage medium of claim 10, wherein the method further comprises blocking, by the computer system, a second establishment location associated with the user account from electronic access to the version type of the software application selection, wherein the blocking electronic access to the version type of the software application selection is based on determining whether the locations database indicates that the second establishment location is permitted to access the version type of the software application selection.

14. The computer-readable, non-transitory storage medium of claim 13, wherein the blocking electronic access to the version type of the software application selection is performed in real time.

15. The computer-readable, non-transitory storage medium of claim 10, wherein the method further comprises:

receiving, by the computer system through the computer network, a computing device selection, the computing device selection selected from one or more computing devices associated with the establishment location selection; and storing, by the computer system, in the locations database that the computing device selection comprises permission rights to access the software application selection.

16. The computer-readable, non-transitory storage medium of claim 15, wherein the method further comprises blocking, by the computer system, a second computing device associated with the establishment location selection from electronic access to the software application selection, wherein the blocking electronic access to the software application selection is based on determining whether the locations database indicates that the second computing device is permitted to access the software application selection.

17. The computer-readable, non-transitory storage medium of claim 16, wherein the blocking electronic access to the software application selection is performed in real time.

18. The computer-readable, non-transitory storage medium of claim 10, wherein the method further comprises:

receiving, by the computer system through the computer network, a second establishment location selection where the software application selection is to be installed, the second establishment location selection is selected from the one or more establishment locations associated with the user account of the user; and storing, by the computer system, in the locations database that the second establishment location selection comprises permission rights to access the software application selection.

* * * * *